(12) United States Patent
Venugopal et al.

(10) Patent No.: US 11,832,148 B2
(45) Date of Patent: Nov. 28, 2023

(54) DOPPLER BASED USER EQUIPMENT GROUPING

(71) Applicant: QUALCOMM Incorporated, San Diego, CA (US)

(72) Inventors: Kiran Venugopal, Raritan, NJ (US); Wooseok Nam, San Diego, CA (US); Tianyang Bai, Somerville, NJ (US); Junyi Li, Fairless Hills, PA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 45 days.

(21) Appl. No.: 17/645,141

(22) Filed: Dec. 20, 2021

(65) Prior Publication Data

US 2023/0199441 A1    Jun. 22, 2023

(51) Int. Cl.
*H04W 4/08* (2009.01)
*H04W 56/00* (2009.01)

(52) U.S. Cl.
CPC ........... *H04W 4/08* (2013.01); *H04W 56/004* (2013.01)

(58) Field of Classification Search
CPC ..... H04W 4/08; H04W 56/004; H04W 84/06; H04W 84/04; H04L 43/00
See application file for complete search history.

(56) References Cited

U.S. PATENT DOCUMENTS

| 7,024,196 | B1* | 4/2006 | Kotzin | H04W 52/0216 |
| | | | | 455/445 |
| 2002/0080760 | A1* | 6/2002 | Anja | H04B 1/7093 |
| | | | | 375/E1.018 |
| 2013/0077595 | A1* | 3/2013 | Aiba | H04L 1/0041 |
| | | | | 370/329 |
| 2014/0057670 | A1* | 2/2014 | Lim | H04W 48/16 |
| | | | | 455/509 |
| 2016/0205715 | A1* | 7/2016 | Seo | H04W 76/14 |
| | | | | 370/329 |
| 2016/0352445 | A1* | 12/2016 | Wu | H04L 69/28 |
| 2017/0126308 | A1* | 5/2017 | Astrom | H04W 24/08 |
| 2017/0257149 | A1* | 9/2017 | Axmon | H04B 7/086 |

(Continued)

FOREIGN PATENT DOCUMENTS

| EP | 3342058 B1 | 7/2020 |
| WO | 2021207573 | 10/2021 |

OTHER PUBLICATIONS

CATT: "Evaluation for HST-SFN Deployment", 3GPP TSG RAN WG1 #104b-e, R1-2102605, 3rd Generation Partnership Project Gpp), Mobile Competence Centre, 650, Route Des Lucioles, F-06921 Sophia-antipolis Cedex, France, vol. RAN WG1, No. e-Meeting, Apr. 12, 2021-Apr. 20, 2021, 11 Pages, Apr. 7, 2021, XP052177251, Section 2.1.

(Continued)

*Primary Examiner* — Christine Ng
(74) *Attorney, Agent, or Firm* — Harrity & Harrity, LLP

(57) ABSTRACT

Various aspects of the present disclosure generally relate to wireless communication. In some aspects, a user equipment (UE) may receive, from a base station, a compensation indicator that is based at least in part on Doppler information associated with a group of UEs in a single frequency network (SFN). The UE may communicate based at least in part on the compensation indicator. Numerous other aspects are described.

30 Claims, 12 Drawing Sheets

(56) References Cited

U.S. PATENT DOCUMENTS

| | | |
|---|---|---|
| 2020/0205062 A1 | 6/2020 | Azizi et al. |
| 2022/0069901 A1* | 3/2022 | Tian ..................... H04L 1/0004 |
| 2022/0070819 A1* | 3/2022 | Barbu ................... G01S 7/0235 |
| 2022/0131803 A1* | 4/2022 | Ko ........................ H04W 72/12 |
| 2022/0209927 A1* | 6/2022 | Shreevastav .......... H04L 5/0069 |
| 2022/0264320 A1* | 8/2022 | Landström ........... H04B 7/0617 |

OTHER PUBLICATIONS

Interdigital et al., "Enhanced M-TRP for HST-SFN", 3GPP TSG RAN WG1 #102-e, R1-2005486, 3rd Generation Partnership Project, Mobile Competence Centre, 650, Route Des Lucioles, F-06921 Sophia-antipolis Cedex, France, vol. RAN WG1, No. e-Meeting, Aug. 17, 2020-Aug. 28, 2020, 9 Pages, Aug. 7, 2020, XP051914955, Section 3, figure 4.
International Search Report and Written Opinion—PCT/US2022/079563—ISA/EPO—dated Feb. 10, 2023.

\* cited by examiner

DOPPLER BASED USER EQUIPMENT GROUPING

FIELD OF THE DISCLOSURE

Aspects of the present disclosure generally relate to wireless communication and to techniques and apparatuses for Doppler based user equipment grouping.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving, from a base station, a compensation indicator that is based at least in part on Doppler information associated with a group of UEs in a single frequency network (SFN). The method may include communicating based at least in part on the compensation indicator.

Some aspects described herein relate to a method of wireless communication performed by a base station. The method may include receiving Doppler information associated with a group of UEs in an SFN. The method may include transmitting, to the group of UEs in the SFN, a compensation indicator that is based at least in part on the Doppler information.

Some aspects described herein relate to an apparatus for wireless communication performed by a UE. The apparatus may include a memory and one or more processors, coupled to the memory. The one or more processors may be configured to receive, from a base station, a compensation indicator that is based at least in part on Doppler information associated with a group of UEs in an SFN. The one or more processors may be configured to communicate based at least in part on the compensation indicator.

Some aspects described herein relate to an apparatus for wireless communication performed by a base station. The apparatus may include a memory and one or more processors, coupled to the memory. The one or more processors may be configured to receive Doppler information associated with a group of UEs in an SFN. The one or more processors may be configured to transmit, to the group of UEs in the SFN, a compensation indicator that is based at least in part on the Doppler information.

Some aspects described herein relate to a non-transitory computer-readable medium that stores a set of instructions for wireless communication by a UE. The set of instructions, when executed by one or more processors of the UE, may cause the UE to receive, from a base station, a compensation indicator that is based at least in part on Doppler information associated with a group of UEs in an SFN. The set of instructions, when executed by one or more processors of the UE, may cause the UE to communicate based at least in part on the compensation indicator.

Some aspects described herein relate to a non-transitory computer-readable medium that stores a set of instructions for wireless communication by a base station. The set of instructions, when executed by one or more processors of the base station, may cause the base station to receive Doppler information associated with a group of UEs in an SFN. The set of instructions, when executed by one or more processors of the base station, may cause the base station to transmit, to the group of UEs in the SFN, a compensation indicator that is based at least in part on the Doppler information.

Some aspects described herein relate to an apparatus for wireless communication. The apparatus may include means for receiving, from a base station, a compensation indicator that is based at least in part on Doppler information associated with a group of apparatuses in an SFN. The apparatus may include means for communicating based at least in part on the compensation indicator.

Some aspects described herein relate to an apparatus for wireless communication. The apparatus may include means for receiving Doppler information associated with a group of UEs in an SFN. The apparatus may include means for transmitting, to the group of UEs in the SFN, a compensation indicator that is based at least in part on the Doppler information.

Aspects generally include a method, apparatus, system, computer program product, non-transitory computer-readable medium, user equipment, base station, wireless communication device, and/or processing system as substantially described herein with reference to and as illustrated by the drawings.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

Figure 1:
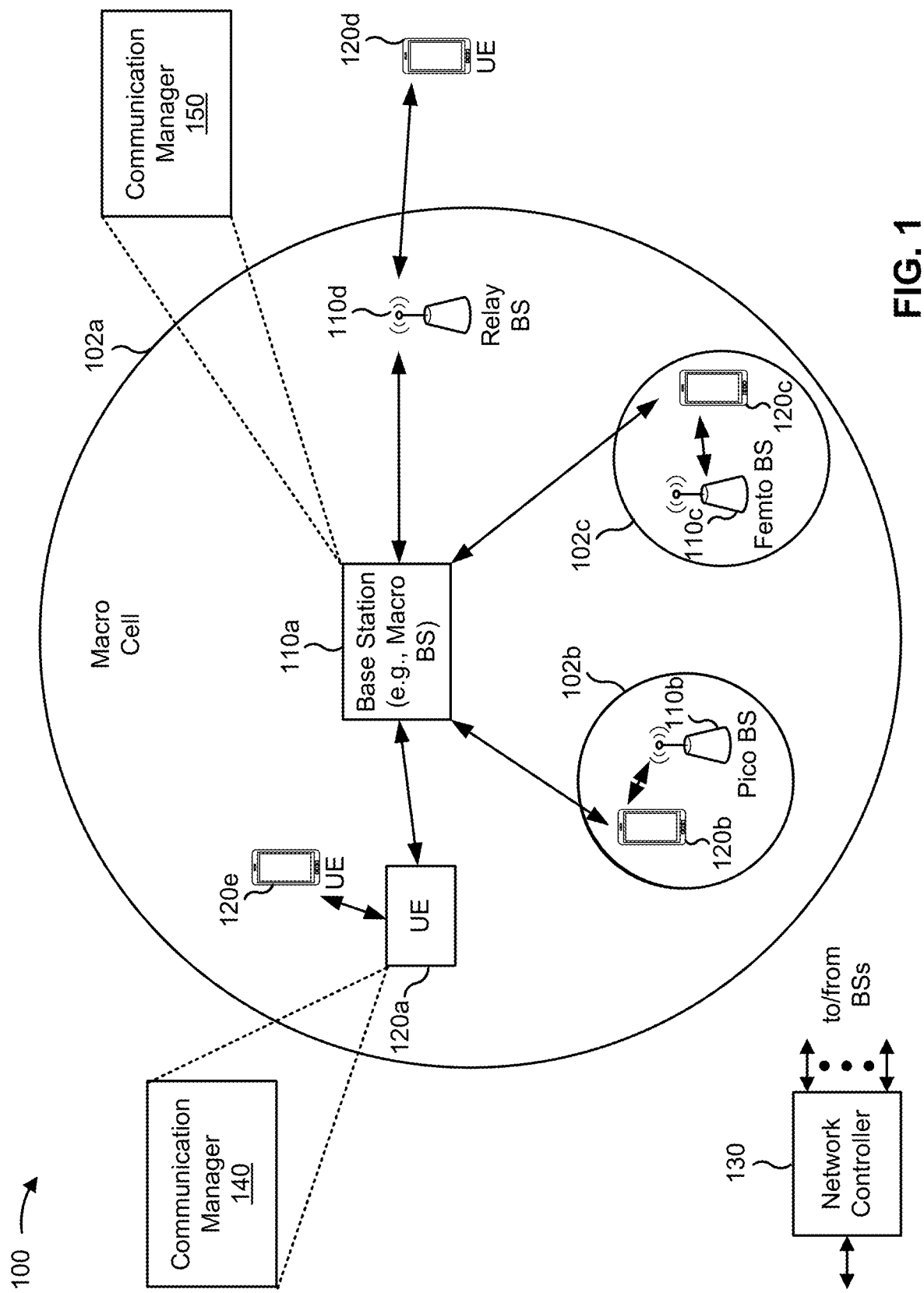
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive, from a base station, a compensation indicator that is based at least in part on Doppler information associated with a group of UEs in a single frequency network (SFN); and communicate based at least in part on the compensation indicator. Additionally, or alternatively, the communication manager 140 may perform one or more other operations described herein.

In some aspects, the base station 110 may include a communication manager 150. As described in more detail elsewhere herein, the communication manager 150 may receive Doppler information associated with a group of UEs in an SFN; and transmit, to the group of UEs in the SFN, a compensation indicator that is based at least in part on the Doppler information. Additionally, or alternatively, the communication manager 150 may perform one or more other operations described herein.

As indicated above, FIG. 1 is provided as an example. Other examples may differ from what is described with regard to FIG. 1.

Figure 2:
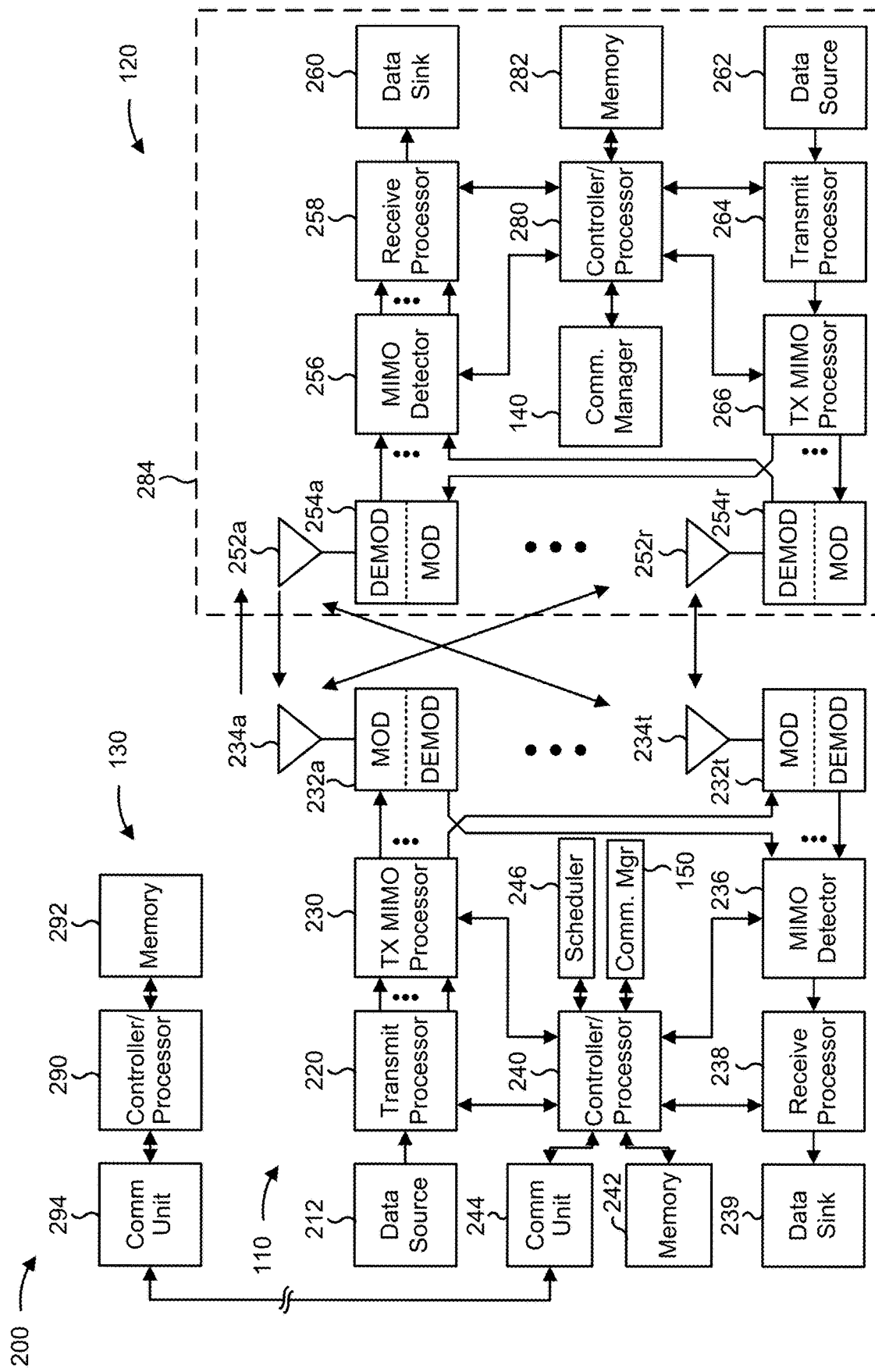
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 8-12).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 8-12).

The controller/processor 240 of the base station 110, the controller/processor 280 of the UE 120, and/or any other component(s) of FIG. 2 may perform one or more techniques associated with Doppler based UE grouping, as described in more detail elsewhere herein. For example, the controller/processor 240 of the base station 110, the controller/processor 280 of the UE 120, and/or any other component(s) of FIG. 2 may perform or direct operations of, for example, process 900 of FIG. 9, process 1000 of FIG. 10, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 900 of FIG. 9, process 1000 of FIG. 10, and/or other processes as described herein. In some examples, executing instructions may include running the instructions, converting the instructions, compiling the instructions, and/or interpreting the instructions, among other examples.

In some aspects, the UE includes means for receiving, from a base station, a compensation indicator that is based at least in part on Doppler information associated with a group of UEs in an SFN; and/or means for communicating based at least in part on the compensation indicator. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the base station includes means for receiving Doppler information associated with a group of UEs in an SFN; and/or means for transmitting, to the group of UEs in the SFN, a compensation indicator that is based at least in part on the Doppler information. The means for the base station to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
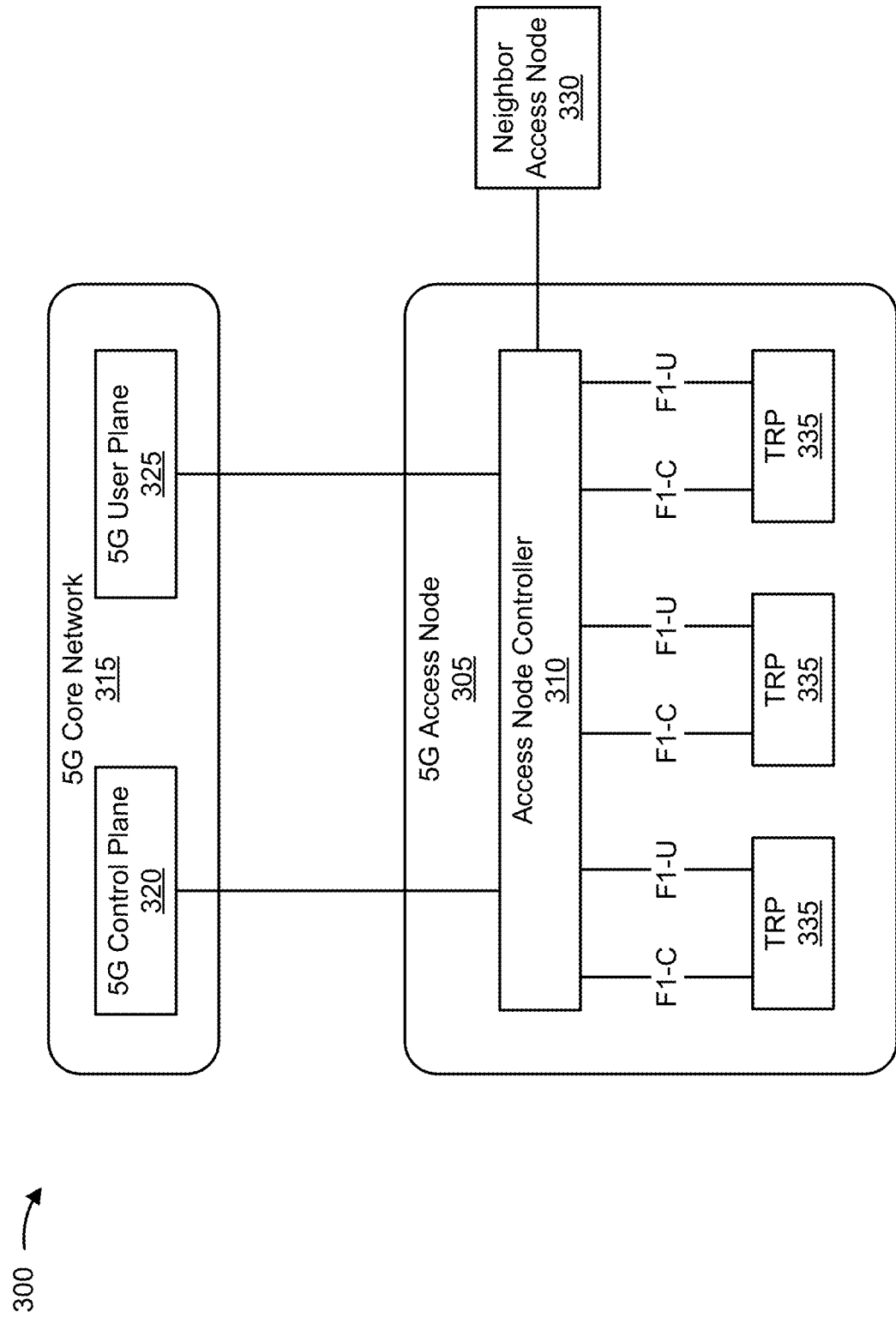
FIG. 3 is a diagram illustrating an example of logical architecture of a distributed radio access network, in accordance with the present disclosure.

FIG. 3 illustrates an example logical architecture of a distributed RAN 300, in accordance with the present disclosure.

A 5G access node 305 may include an access node controller 310. The access node controller 310 may be a central unit (CU) of the distributed RAN 300. In some aspects, a backhaul interface to a 5G core network 315 may terminate at the access node controller 310. The 5G core network 315 may include a 5G control plane component 320 and a 5G user plane component 325 (e.g., a 5G gateway), and the backhaul interface for one or both of the 5G control plane and the 5G user plane may terminate at the access node controller 310. Additionally, or alternatively, a backhaul interface to one or more neighbor access nodes 330 (e.g., another 5G access node 305 and/or an LTE access node) may terminate at the access node controller 310.

The access node controller 310 may include and/or may communicate with one or more TRPs 335 (e.g., via an F1 Control (F1-C) interface and/or an F1 User (F1-U) interface). A TRP 335 may be a distributed unit (DU) of the distributed RAN 300. In some aspects, a TRP 335 may correspond to a base station 110 described above in connection with FIG. 1. For example, different TRPs 335 may be included in different base stations 110. Additionally, or alternatively, multiple TRPs 335 may be included in a single base station 110. In some aspects, a base station 110 may include a CU (e.g., access node controller 310) and/or one or more DUs (e.g., one or more TRPs 335). In some cases, a TRP 335 may be referred to as a cell, a panel, an antenna array, or an array.

A TRP 335 may be connected to a single access node controller 310 or to multiple access node controllers 310. In some aspects, a dynamic configuration of split logical functions may be present within the architecture of distributed RAN 300. For example, a packet data convergence protocol (PDCP) layer, a radio link control (RLC) layer, and/or a medium access control (MAC) layer may be configured to terminate at the access node controller 310 or at a TRP 335.

In some aspects, multiple TRPs 335 may transmit communications (e.g., the same communication or different communications) in the same transmission time interval (TTI) (e.g., a slot, a mini-slot, a subframe, or a symbol) or different TTIs using different quasi co-location (QCL) relationships (e.g., different spatial parameters, different transmission configuration indicator (TCI) states, different precoding parameters, and/or different beamforming parameters). In some aspects, a TCI state may be used to indicate one or more QCL relationships. A TRP 335 may be configured to individually (e.g., using dynamic selection) or jointly (e.g., using joint transmission with one or more other TRPs 335) serve traffic to a UE 120.

In some cases, the UE 120 may communicate with a plurality of TRPs 335. For example, a number of the UEs 120 may be present on a high speed train (HST) that is communicating with the plurality of TRPs 335. As described further herein, communications between the UEs 120 and the TRPs 335 may experience a Doppler effect (e.g., Doppler shift and/or Doppler spread) as a result of the high speed movements by the UEs 120.

As indicated above, FIG. 3 is provided as an example. Other examples may differ from what was described with regard to FIG. 3.

Figure 4:
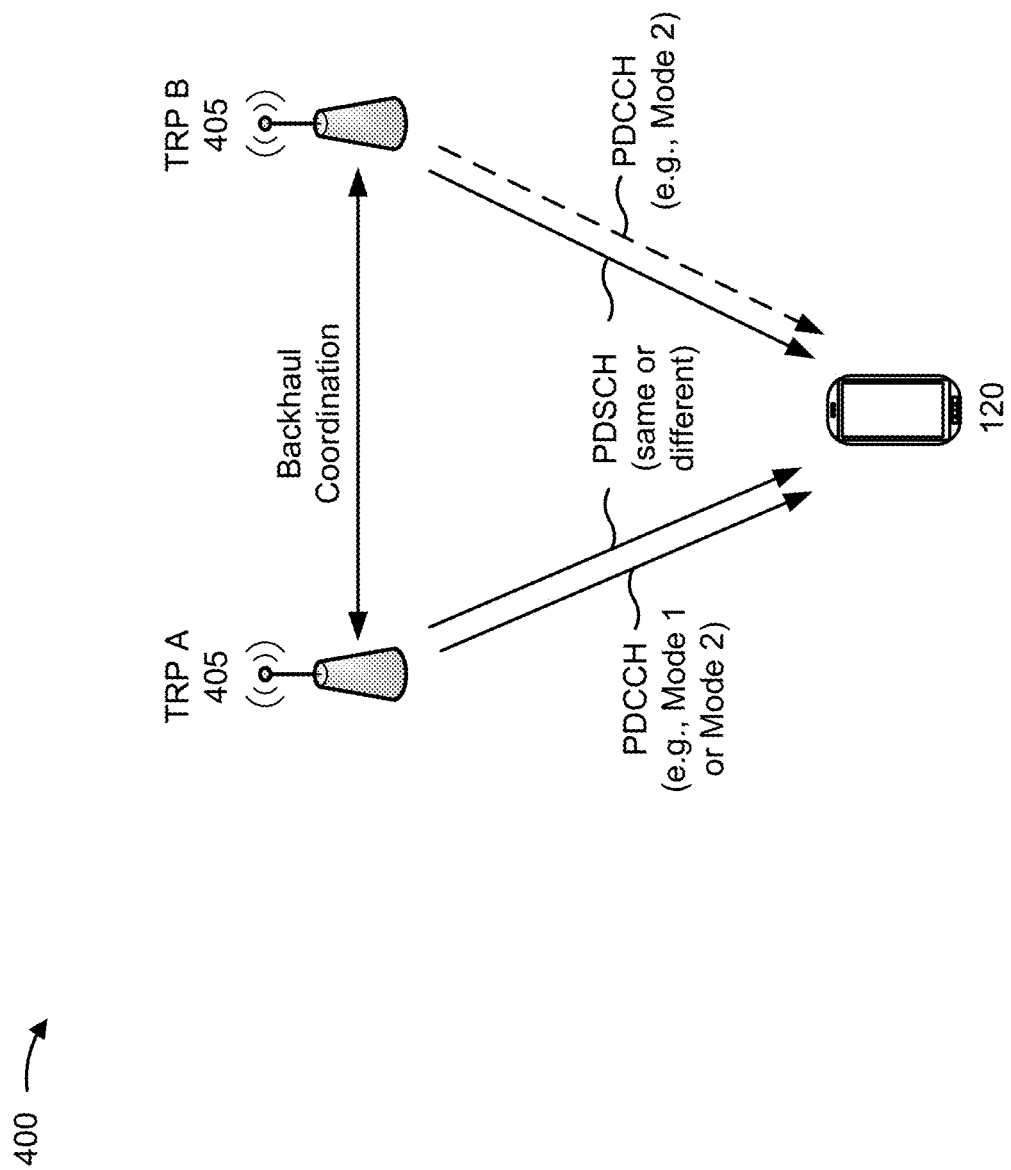
FIG. 4 is a diagram illustrating an example of multiple transmit receive point communication, in accordance with the present disclosure.

FIG. 4 is a diagram illustrating an example 400 of multi-TRP communication (sometimes referred to as multi-panel communication), in accordance with the present disclosure. As shown in FIG. 4, multiple TRPs 405 may communicate with the same UE 120. A TRP 405 may correspond to a TRP 335 described above in connection with FIG. 3.

The multiple TRPs 405 (shown as TRP A and TRP B) may communicate with the same UE 120 in a coordinated manner (e.g., using coordinated multipoint transmissions) to improve reliability and/or increase throughput. The TRPs 405 may coordinate such communications via an interface between the TRPs 405 (e.g., a backhaul interface and/or an access node controller 310). The interface may have a smaller delay and/or higher capacity when the TRPs 405 are co-located at the same base station 110 (e.g., when the TRPs 405 are different antenna arrays or panels of the same base station 110), and may have a larger delay and/or lower capacity (as compared to co-location) when the TRPs 405 are located at different base stations 110. The different TRPs 405 may communicate with the UE 120 using different QCL relationships (e.g., different TCI states), different demodulation reference signal (DMRS) ports, and/or different layers (e.g., of a multi-layer communication).

In a first multi-TRP transmission mode (e.g., Mode 1), a single physical downlink control channel (PDCCH) may be used to schedule downlink data communications for a single physical downlink shared channel (PDSCH). In this case, multiple TRPs 405 (e.g., TRP A and TRP B) may transmit communications to the UE 120 on the same PDSCH. For example, a communication may be transmitted using a single codeword with different spatial layers for different TRPs 405 (e.g., where one codeword maps to a first set of layers transmitted by a first TRP 405 and maps to a second set of layers transmitted by a second TRP 405). As another example, a communication may be transmitted using multiple codewords, where different codewords are transmitted by different TRPs 405 (e.g., using different sets of layers). In either case, different TRPs 405 may use different QCL relationships (e.g., different TCI states) for different DMRS ports corresponding to different layers. For example, a first TRP 405 may use a first QCL relationship or a first TCI state for a first set of DMRS ports corresponding to a first set of layers, and a second TRP 405 may use a second (different) QCL relationship or a second (different) TCI state for a second (different) set of DMRS ports corresponding to a second (different) set of layers. In some aspects, a TCI state in downlink control information (DCI) (e.g., transmitted on the PDCCH, such as DCI format 1_0 or DCI format 1_1) may indicate the first QCL relationship (e.g., by indicating a first TCI state) and the second QCL relationship (e.g., by indicating a second TCI state). The first and the second TCI states may be indicated using a TCI field in the DCI. In general, the TCI field can indicate a single TCI state (for single-TRP transmission) or multiple TCI states (for multi-TRP transmission as described here) in this multi-TRP transmission mode (e.g., Mode 1).

In a second multi-TRP transmission mode (e.g., Mode 2), multiple PDCCHs may be used to schedule downlink data communications for multiple corresponding PDSCHs (e.g., one PDCCH for each PDSCH). In this case, a first PDCCH may schedule a first codeword to be transmitted by a first TRP 405, and a second PDCCH may schedule a second codeword to be transmitted by a second TRP 405. Furthermore, first DCI (e.g., transmitted by the first TRP 405) may schedule a first PDSCH communication associated with a first set of DMRS ports with a first QCL relationship (e.g., indicated by a first TCI state) for the first TRP 405, and second DCI (e.g., transmitted by the second TRP 405) may schedule a second PDSCH communication associated with a second set of DMRS ports with a second QCL relationship (e.g., indicated by a second TCI state) for the second TRP 405. In this case, DCI (e.g., having DCI format 1_0 or DCI format 1_1) may indicate a corresponding TCI state for a TRP 405 corresponding to the DCI. The TCI field of a DCI indicates the corresponding TCI state (e.g., the TCI field of the first DCI indicates the first TCI state and the TCI field of the second DCI indicates the second TCI state).

In some cases, the UE 120 may communicate with a plurality of TRPs 335. For example, a number of the UEs 120 may be present on an HST that is communicating with the plurality of TRPs 335. As described further herein, communications between the UEs 120 and the TRPs 335 may experience a Doppler effect (e.g., Doppler shift and/or Doppler spread) as a result of the high speed movements by the UEs 120.

As indicated above, FIG. 4 is provided as an example. Other examples may differ from what is described with respect to FIG. 4.

Figure 5:
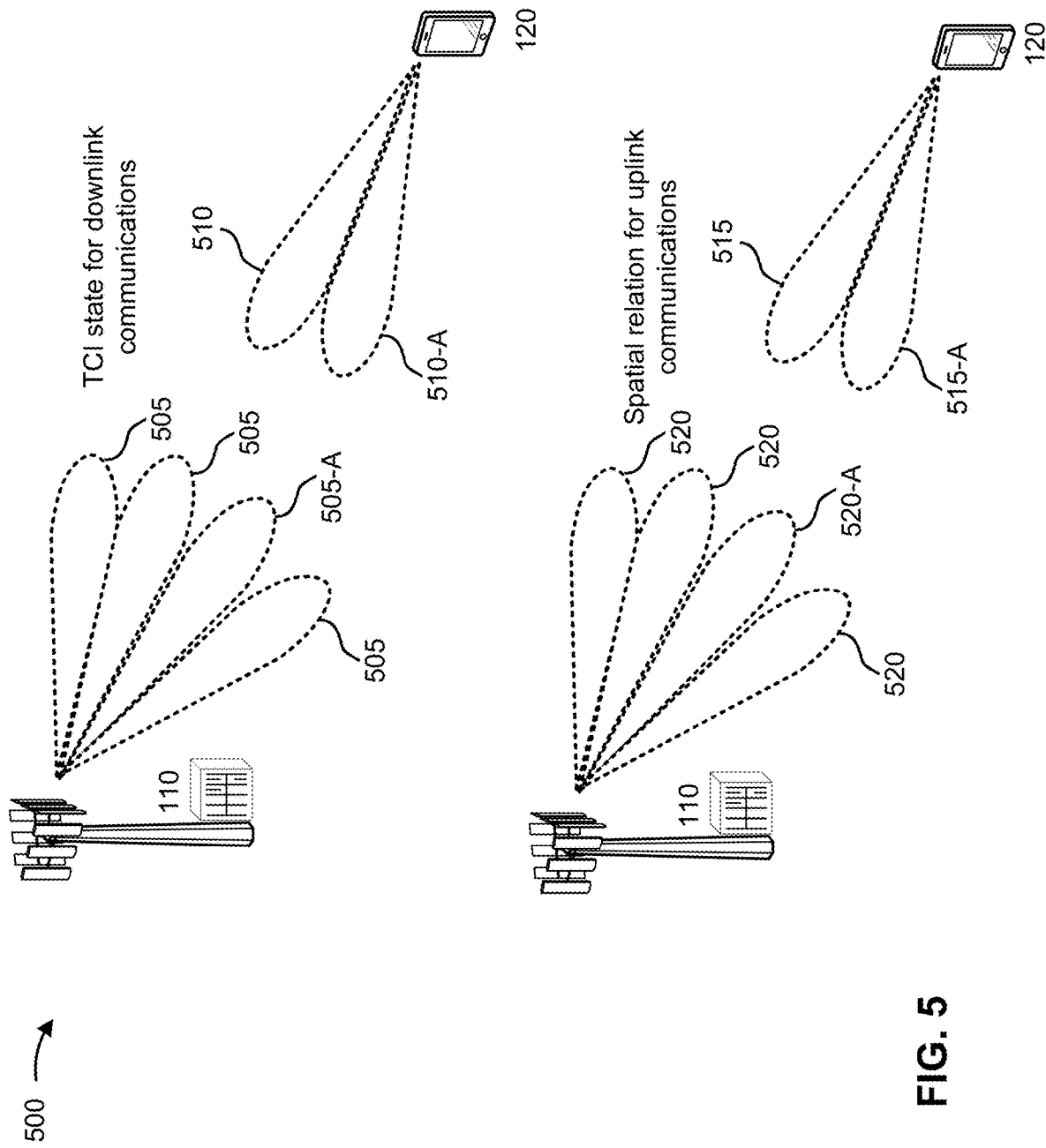
FIG. 5 is a diagram illustrating an example of single frequency network (SFN) communication, in accordance with the present disclosure.

FIG. 5 is a diagram illustrating an example 500 of using beams for communications between a base station and a UE, in accordance with the present disclosure. As shown in FIG. 5, a base station 110 and a UE 120 may communicate with one another.

The base station 110 may transmit to UEs 120 located within a coverage area of the base station 110. The base station 110 and the UE 120 may be configured for beamformed communications, where the base station 110 may transmit in the direction of the UE 120 using a directional BS transmit beam, and the UE 120 may receive the transmission using a directional UE receive beam. Each BS transmit beam may have an associated beam ID, beam direction, or beam symbols, among other examples. The base station 110 may transmit downlink communications via one or more BS transmit beams 505.

The UE 120 may attempt to receive downlink transmissions via one or more UE receive beams 510, which may be configured using different beamforming parameters at receive circuitry of the UE 120. The UE 120 may identify a particular BS transmit beam 505, shown as BS transmit beam 505-A, and a particular UE receive beam 510, shown as UE receive beam 510-A, that provide relatively favorable performance (for example, that have a best channel quality of the different measured combinations of BS transmit beams 505 and UE receive beams 510). In some examples, the UE 120 may transmit an indication of which BS transmit beam 505 is identified by the UE 120 as a preferred BS transmit beam, which the base station 110 may select for transmissions to the UE 120. The UE 120 may thus attain and maintain a beam pair link (BPL) with the base station 110 for downlink communications (for example, a combination of the BS transmit beam 505-A and the UE receive beam 510-A), which may be further refined and maintained in accordance with one or more established beam refinement procedures.

A downlink beam, such as a BS transmit beam 505 or a UE receive beam 510, may be associated with a transmission configuration indication (TCI) state. A TCI state may indicate a directionality or a characteristic of the downlink beam, such as one or more QCL properties of the downlink beam. A QCL property may include, for example, a Doppler shift, a Doppler spread, an average delay, a delay spread, or spatial receive parameters, among other examples. In some examples, each BS transmit beam 505 may be associated with a synchronization signal block (SSB), and the UE 120 may indicate a preferred BS transmit beam 505 by transmitting uplink transmissions in resources of the SSB that are associated with the preferred BS transmit beam 505. A particular SSB may have an associated TCI state (for example, for an antenna port or for beamforming). The base station 110 may, in some examples, indicate a downlink BS transmit beam 505 based at least in part on antenna port QCL properties that may be indicated by the TCI state. A TCI state may be associated with one downlink reference signal set (for example, an SSB and an aperiodic, periodic, or semi-persistent channel state information reference signal (CSI-RS)) for different QCL types (for example, QCL types for different combinations of Doppler shift, Doppler spread, average delay, delay spread, or spatial receive parameters, among other examples). In cases where the QCL type indicates spatial receive parameters, the QCL type may correspond to analog receive beamforming parameters of a UE receive beam 510 at the UE 120. Thus, the UE 120 may select a corresponding UE receive beam 510 from a set of BPLs based at least in part on the base station 110 indicating a BS transmit beam 505 via a TCI indication.

The base station 110 may maintain a set of activated TCI states for downlink shared channel transmissions and a set of activated TCI states for downlink control channel transmissions. The set of activated TCI states for downlink shared channel transmissions may correspond to beams that the base station 110 uses for downlink transmission on a physical downlink shared channel (PDSCH). The set of activated TCI states for downlink control channel communications may correspond to beams that the base station 110 may use for downlink transmission on a physical downlink control channel (PDCCH) or in a control resource set (CORESET). The UE 120 may also maintain a set of activated TCI states for receiving the downlink shared channel transmissions and the CORESET transmissions. If a TCI state is activated for the UE 120, then the UE 120 may have one or more antenna configurations based at least in part on the TCI state, and the UE 120 may not need to reconfigure antennas or antenna weighting configurations. In some examples, the set of activated TCI states (for example, activated PDSCH TCI states and activated CORESET TCI states) for the UE 120 may be configured by a configuration message, such as a radio resource control (RRC) message.

Similarly, for uplink communications, the UE 120 may transmit in the direction of the base station 110 using a directional UE transmit beam, and the base station 110 may receive the transmission using a directional BS receive beam. Each UE transmit beam may have an associated beam ID, beam direction, or beam symbols, among other examples. The UE 120 may transmit uplink communications via one or more UE transmit beams 515.

The base station 110 may receive uplink transmissions via one or more BS receive beams 520. The base station 110 may identify a particular UE transmit beam 515, shown as UE transmit beam 515-A, and a particular BS receive beam 520, shown as BS receive beam 520-A, that provide relatively favorable performance (for example, that have a best channel quality of the different measured combinations of UE transmit beams 515 and BS receive beams 520). In some examples, the base station 110 may transmit an indication of which UE transmit beam 515 is identified by the base station 110 as a preferred UE transmit beam, which the base station 110 may select for transmissions from the UE 120. The UE 120 and the base station 110 may thus attain and maintain a BPL for uplink communications (for example, a combination of the UE transmit beam 515-A and the BS receive beam 520-A), which may be further refined and maintained in accordance with one or more established beam refinement procedures. An uplink beam, such as a UE transmit beam 515 or a BS receive beam 520, may be associated with a spatial relation. A spatial relation may indicate a directionality or a characteristic of the uplink beam, similar to one or more QCL properties, as described above.

In some cases, communications between the UE 120 and the base station 110 may experience the Doppler effect due, for example, to movements by the UE 120 and/or the base station 110. The base station 110 may transmit, to the UE 120, or to other UEs 120, an indication to adjust certain communication parameters, such as the TCI and QCL parameters described above, in order to reduce or eliminate the impact of the Doppler effect.

As indicated above, FIG. 5 is provided as an example. Other examples may differ from what is described with respect to FIG. 5.

Figure 6:
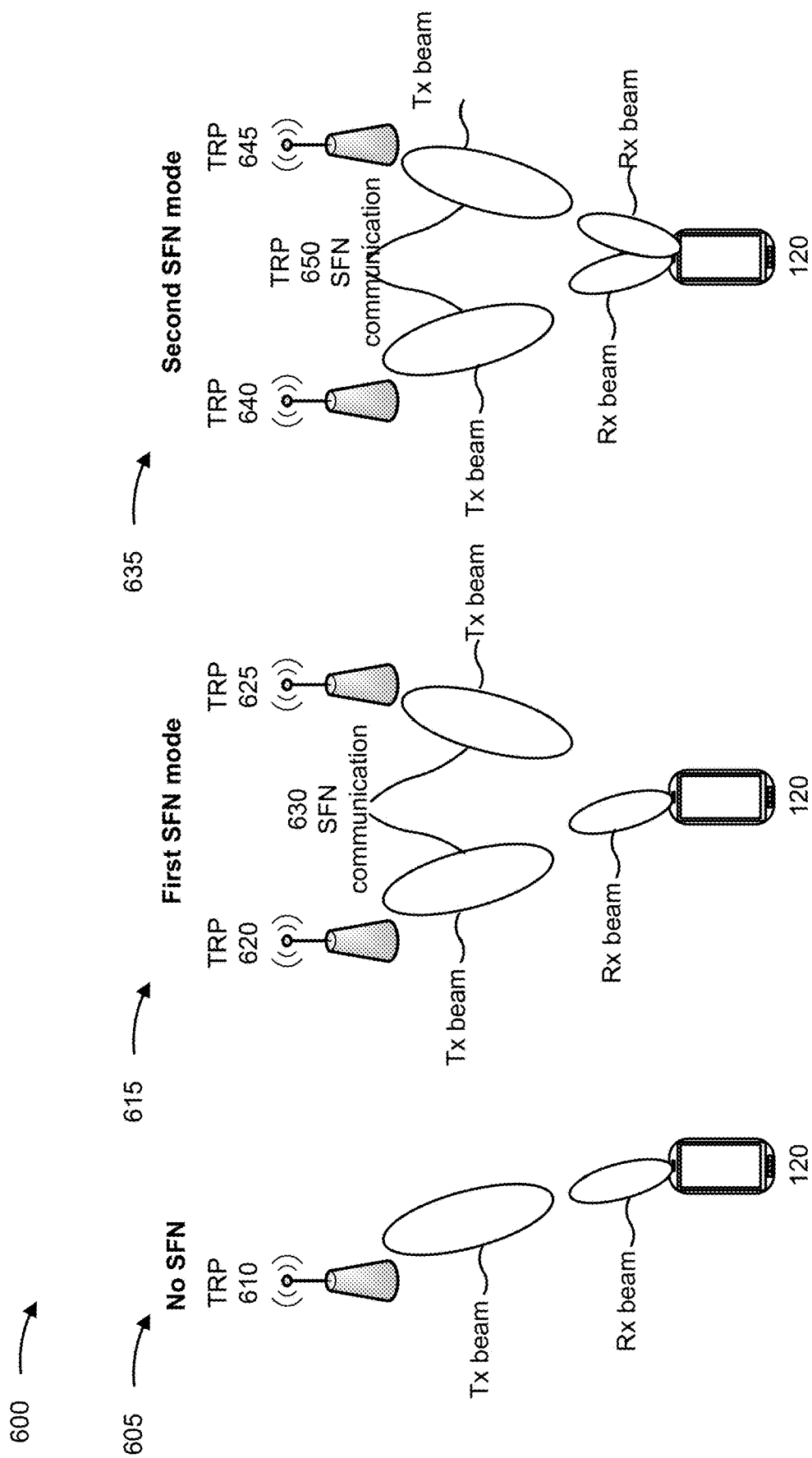
FIG. 6 is a diagram illustrating an example of using beams for communications between a base station and a UE, in accordance with the present disclosure.

FIG. 6 is a diagram illustrating an example 600 associated with SFN communication, in accordance with the present disclosure.

As shown by reference number 605, an example of communications that do not use an SFN configuration is depicted. A TRP 610 may transmit communications using a transmit (Tx) beam to the UE 120. The transmit beam may be associated with a TCI state. The UE 120 may receive communications (e.g., transmitted by the TRP 610) using a receive (Rx) beam. For example, the UE 120 may identify the TCI state associated with the transmit beam and may use information provided by the TCI state to receive the communications.

As shown by reference number 615, an example of a first SFN mode is depicted. As shown in FIG. 6, a first TRP 620 (or a first base station 110) and a second TRP 625 (or a second base station 110) may transmit an SFN communication 630 to the UE 120. For example, the first TRP 620 and the second TRP 625 may transmit substantially the same information (e.g., the SFN communication 630) to the UE 120 using the same frequency domain resources and the same time domain resources. The first TRP 620 may transmit the SFN communication 630 using a first transmit beam. The second TRP 625 may transmit the SFN communication 630 using a second transmit beam. In the first SFN mode, the UE 120 may be unaware that the SFN communication 630 is transmitted on separate transmit beams (e.g., from different TRPs and/or different base stations 110). Accordingly, when the multiple base stations (and/or multiple TRPs) simultaneously transmit the same signal to a UE 120, the SFN configuration may be transparent to the UE 120, and the UE 120 may aggregate, or accumulate, the simultaneous signal transmissions from the multiple TRPs (and/or multiple base stations 110), which may provide higher signal quality or higher tolerance for multipath attenuation, among other benefits. For example, the UE 120 may receive the SFN communication 630 using a single receive beam (e.g., may use a single spatial receive direction, among other examples, to receive the SFN communication 630). In other words, TCI states of the different transmit beams used to transmit the SFN communication 630 may not be signaled to the UE 120.

As shown by reference number 635, an example of a second SFN mode is depicted. As shown in FIG. 6, a first TRP 640 (or a first base station 110) and a second TRP 645 (or a second base station 110) may transmit an SFN communication 650 to the UE 120. For example, the first TRP 640 and the second TRP 645 may transmit substantially the same information (e.g., the SFN communication 650) to the UE 120 using the same frequency domain resources and the same time domain resources. The first TRP 640 may transmit the SFN communication 650 using a first transmit beam. The second TRP 645 may transmit the SFN communication 650 using a second transmit beam. In the second SFN mode, the UE 120 may be aware that the SFN communication 650 is transmitted on separate transmit beams (e.g., from different TRPs and/or different base stations 110). For example, a first TCI state of the first transmit beam (e.g., associated with the first TRP 640) and a second TCI state of the second transmit beam (e.g., associated with the second TRP 645) may be signaled to the UE 120. For example, a base station 110 may transmit configuration information that indicates that the SFN communication 650 may be a combination of transmissions from different TRPs and/or different transmit beams. The UE 120 may use the information associated with the different TRPs and/or different transmit beams (e.g., the first TCI state and the second TCI state) to improve a reception performance of the SFN communication 650. For example, as shown in FIG. 6, the UE 120 may use different spatial directions (e.g., different receive beams) to receive the SFN communication 650 based at least in part on the TCI states of the transmit beam(s) associated with the SFN communication 650. This may improve a performance of the UE 120 because the UE 120 may receive the SFN communication 650 from different transmit beams and/or different TRPs with improved signal strength and/or signal quality, among other examples.

In some cases, the SFN (e.g., SFN 635) may include a number of UEs 120 and a number of TRPs (e.g., TRP 640 and TRP 645). For example, the SFN 635 may include multiple UEs 120 (e.g., cell phones) that are located on an HST and are communicating with multiple antennas (e.g., TRP 640 and TRP 645). As described further herein, communications by the UEs 120 may experience a Doppler effect as a result of the high speed movements by the UEs 120 in the SFN 635.

As indicated above, FIG. 6 is provided as an example. Other examples may differ from what is described with respect to FIG. 6.

Figure 7:
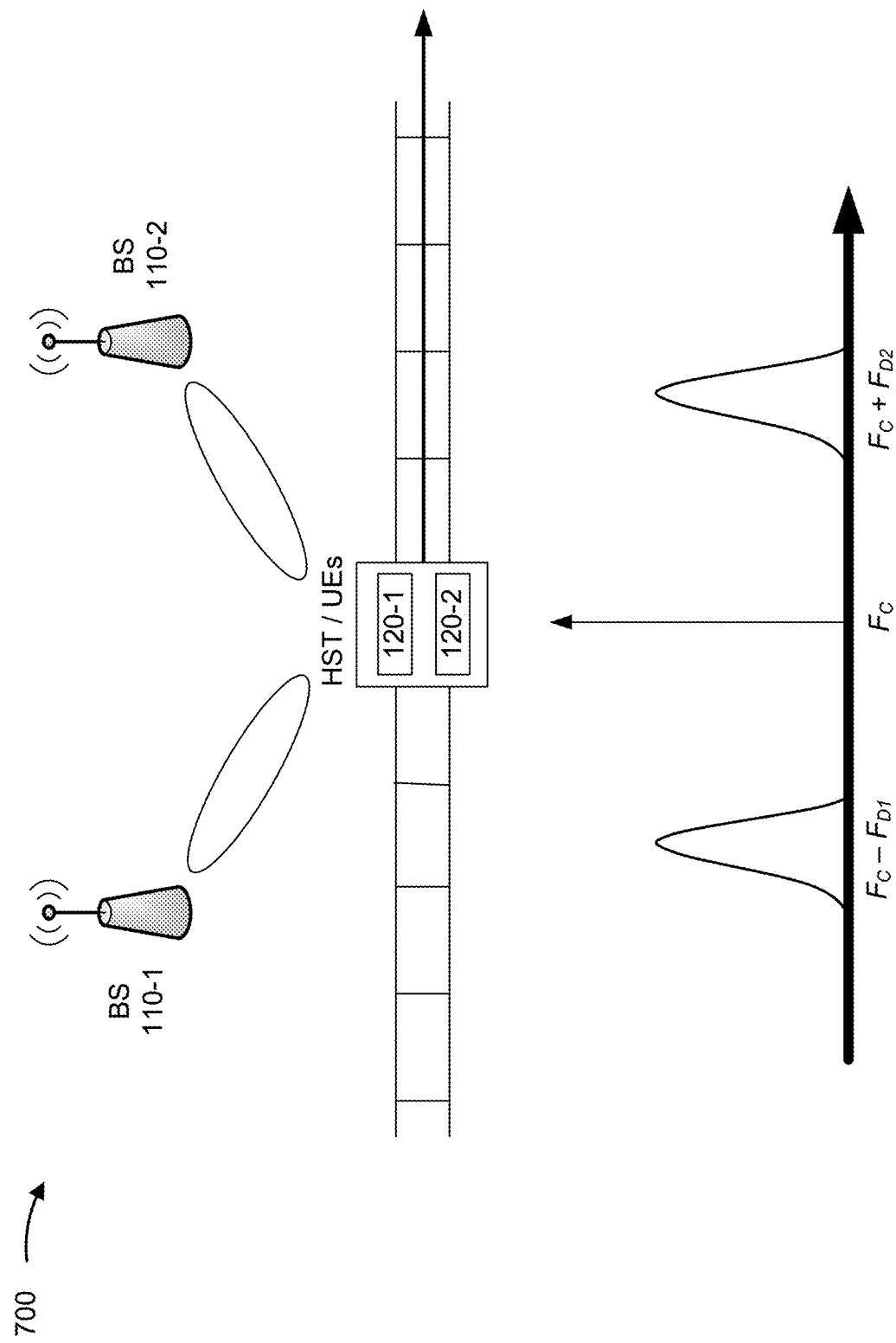
FIG. 7 is a diagram illustrating an example of signaling compensation, in accordance with the present disclosure.

FIG. 7 shows an example of signaling compensation, in accordance with the present disclosure. As shown, one or more UEs 120, such as the UE 120-1 and the UE 120-2, may communicate with a plurality base stations 110 (e.g., TRPs), such as the base station 110-1 and the base station 110-2. The UEs 120 may be moving at similar velocities with respect to the base stations 110. For example, the UEs 120 may be located on an HST (e.g., in the same car of an HST). In some cases, the distance between the UE 120-1 and the UE 120-2 may be small as compared to the distance between the UEs 120 and the base stations 110. For example, the UE 120-1 may be located within a few feet of the UE 120-2, while the UEs 120-1 and 120-2 may be located hundreds of feet, or thousands of feet, away from the base station 110-1 and/or the base station 110-2. Thus, the UEs 120 may experience similar Doppler effects (e.g., Doppler shift and/or Doppler spread) when moving at high speeds relative to the base stations 110.

In some cases, the UE 120-1 may receive a first communication from the base station 110-1 having a frequency $F_C$. However, the frequency of the first communication, as detected by the UE 120-1, may be offset (e.g., as shown by $F_C\text{-}F_{D1}$) as a result of the Doppler effect caused by the UE 120-1 moving relative to the base station 110-1. Similarly, the UE 120-1 may receive a second communication from the base station 110-2 having a frequency $F_C$. However, the frequency of the second communication, as detected by the UE 120-1, may be offset (e.g., as shown by $F_C\text{+}F_{D2}$) as a result of the Doppler effect caused by the UE 120-1 moving relative to the base station 110-2. In some cases, a compensation indicator may be determined based at least in part on the frequency offset, and may be applied to future communications between the base stations 110 and the UEs 120. A communication that is transmitted in accordance with the compensation indicator may be received with minimal distortion due to the Doppler effect, or with no distortion due to the Doppler effect. In some cases, the compensation indicator may enable a UE (e.g., the UE 120-1) to determine a frequency for setting its demodulation block. For example, $F_C+F_{D2}$ may be used to track base station 110-1, $F_C-F_{D2}$ may be used to track base station 110-2, among other examples. The base station 110 may adjust (e.g., pre-compensate) its transmissions accordingly.

In some cases, the base stations 110 may determine compensation indicators separately for each of the UEs 120. For example, the base station 110-1 may transmit a first communication to the UE 120-1, determine a compensation indicator based at least in part on Doppler information, and transmit the compensation indicator to the UE 120-1. Similarly, the base station 110-1 may transmit a second communication to the UE 120-2, determine a compensation indicator based at least in part on Doppler information, and transmit the compensation indicator to the UE 120-2. However, since the UE 120-1 and the UE 120-2 are close together, and are moving at approximately the same speed, the communications by the UE 120-1 and the UE 120-2 may experience similar, or identical, Doppler effects. Therefore, the compensation indicators sent to UE 120-1 and the UE 120-2 may be similar or identical. Thus, determining the compensation indicators, and transmitting the compensation indicators, separately for each of the UE 120-1 and the UE 120-2, may be a waste of resources, such as a waste of network bandwidth resources, a waste of time resources, and a waste of base station processing resources.

Techniques and apparatuses are described herein for Doppler-based UE grouping. For example, a UE may transmit Doppler information that is based at least in part on a location or a velocity of the UE with respect to a base station (e.g., a TRP). In some aspects, the base station may receive Doppler information from multiple UEs that have similar locations, and are traveling at similar velocities, such as in the example of a group of UEs (e.g., cell phones) on an HST. The base station may determine to group the UEs for Doppler based signaling based at least in part on the UEs having similar Doppler information. For example, the base station may determine a compensation indicator for the group of UEs having the similar Doppler information, and may transmit the compensation indicator to the group of UEs (e.g., in a single transmission). The UEs in the group of UEs may receive the compensation indicator (e.g., from the base station or from another UE in the group of UEs), and may communicate with the base station using the compensation indicator.

As described above, since the UEs have similar locations, and are traveling at similar velocities, the UEs may experience similar Doppler effects when communicating with the base station. Since the UEs are experiencing similar Doppler effects, the UEs may apply a similar compensation indicator, or the same compensation indicator, to future communications with the base station in order to reduce, or eliminate, the Doppler effect. By determining the compensation indicators, and transmitting the compensation indicators, at the group level (e.g., one compensation indicator for the group of UEs), the base station may reduce the need for network resources, time resources, and/or processing resources. For example, determining the compensation indicators, and transmitting the compensation indicators, at the group level may use less network bandwidth, may take less time, and may require less processing by the base station.

As indicated above, FIG. 7 is provided as an example. Other examples may differ from what is described with respect to FIG. 7.

Figure 8:
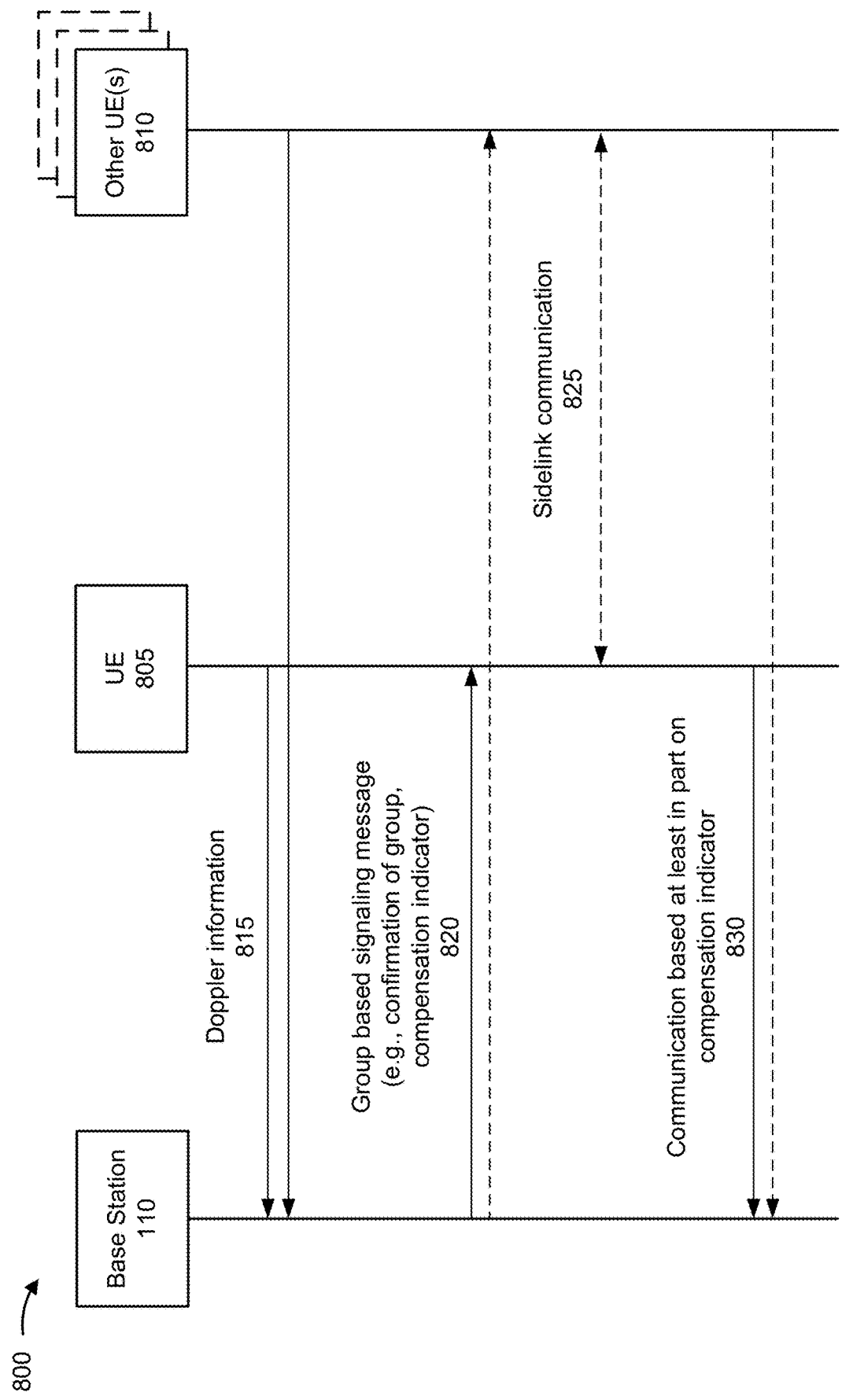
FIG. 8 is a diagram illustrating an example associated with Doppler based UE grouping, in accordance with the present disclosure.

FIG. 8 is a diagram illustrating an example 800 of Doppler based UE grouping, in accordance with the present disclosure. As shown in the figure, a UE, such as the UE 805, may communicate with a base station, such as the base station 110, and one or more other UEs, such as the other UEs 810. The UE 805 and the other UEs 810 may include one or more features of the UE 120. The other UEs 810 may include any number of other UEs 810, such as a single other UE 810, or multiple other UEs 810 (e.g., a first other UE 810 and a second other UE 810). In some aspects, the base station 110 may be a TRP, such as the TRP 335 or the TRP 405. As described above, the UEs 805 and 810 may communicate with multiple base stations 110 in an SFN.

As shown in connection with reference number 815, the UE 805 may transmit, and the base station 110 may receive, Doppler information. The Doppler information may include Doppler shift information and/or Doppler spread information. In some aspects, the Doppler information may include other information, such as location information, movement information (e.g., speed or velocity), CSI information, among other examples. As described above, the Doppler information may indicate a change (e.g., a frequency offset) in a communication as a result of the UE 805 moving relative to the base station 110. In some aspects, the UE 805 may be moving at high speeds, such as in the example where the UE 805 is located on an HST. In some aspects, the Doppler information may be UE-specific Doppler information that is associated with the UE 805. In some aspects, as described further herein, the Doppler information may be group-based Doppler information associated with a group of UEs, such as the UE 805 and the other UEs 810.

In some aspects, the other UEs 810 may transmit Doppler information to the base station 110. As described above, the Doppler information associated with the other UEs 810 may be similar, or may be the same as, the Doppler information associated with the UE 805. For example, the distance between the UE 805 and the other UEs 810 may be small as compared to the distance between the UEs (e.g., UE 805 and 810) and the base station 110. In some aspects, the UE 805 may be located within a few feet of the other UEs 810, and one of the other UEs 810 may be located within a few feet of another one of the other UEs 810, while the UEs (e.g., UE 805 and 810) may be hundreds of feet, or thousands of feet, away from the base station 110. In some aspects, the UE 805 may be located on the same HST as the other UEs 810, or may be located on the same car of the same HST as the other UEs 810.

In some aspects, the UE 805 may transmit the UE-specific Doppler information to the base station 110. For example, the UE 805 may transmit Doppler shift information, Doppler spread information, location information, or velocity information, associated with the UE 805. The UE 805 may determine the UE-specific Doppler information based at least in part on one or more previous communications with the base station 110. In some aspects, the UE 805 may transmit a sounding reference signal (SRS) to the base station 110, and the base station 110 may determine the UE-specific Doppler information based at least in part on the SRS. For example, the base station 110 may receive the SRS from the UE 805, and may determine the Doppler information based at least in part on measuring the uplink channel propagation of the SRS. In some aspects, the UE 805 may transmit channel state information (CSI) to the base station 110, and the base station 110 may determine the UE-specific Doppler information based at least in part on the CSI. For example, the base station 110 may receive the CSI from the UE 805, and may determine the Doppler information based at least in part on channel quality indicators (CQI), rank indicators (RI), or precoding matrix indicators (PMI) that are based at least in part on the CSI. In some aspects, the base station 110 may determine the UE-specific Doppler information for the UE 805 based at least in part on existing information at the base station 110, such as an RSRP indicator associated with the UE 805. For example, the RSRP indicator (e.g., Layer 1 RSRP indicator) may help remove the impact of noise and to improve measurement accuracy, and may be used similarly to the CSI in order to determine the Doppler information associated with the UE 805.

In some aspects, one or more of the other UEs 810 may transmit Doppler information to the base station 110. For example, a first other UE 810 of the other UEs 810 may transmit UE-specific Doppler information, such as Doppler shift information, Doppler spread information, location information, or velocity information, associated with the first other UE 810. The first other UE 810 may determine the UE-specific Doppler information based at least in part on one or more previous communications with the base station 110. In some aspects, the base station 110 may determine the UE-specific Doppler information for the first other UE 810. For example, the first other UE 810 may transmit an SRS or CSI associated with the first other UE 810, and the base station 110 may determine the UE-specific Doppler information for the first other UE 810 based at least in part on the SRS or the CSI. Additionally, or alternatively, the base station 110 may determine the UE-specific Doppler information for the first other UE 810 based at least in part on existing information at the base station 110, such as CSI information or a Layer 1 RSRP associated with the first other UE 810.

In some aspects, the base station 110 may transmit a reporting interval to the UE 805. For example, the base station 110 may indicate for the UE 805 to transmit Doppler information every ten milliseconds (10 ms). The UE 805 may transmit the UE-specific Doppler information to the base station 110 in accordance with the reporting interval. In some aspects, the base station 110 may transmit a reporting interval (e.g., the same reporting interval or a different reporting interval) to the first other UE 810, and the first other UE 810 may transmit the UE-specific Doppler information to the base station 110 in accordance with the reporting interval. In some aspects, as described further herein, the base station may transmit a reporting interval to a group of UEs, and the group of UEs may individually transmit UE-specific Doppler information, or may transmit group-based Doppler information, to the base station 110 in accordance with the reporting interval.

As shown in connection with reference number 820, the base station 110 may transmit a group-based signaling message. As described above, the base station 110 may receive UE-specific Doppler information from the UE 805 and/or from the other UEs 810. The base station 110 may determine that the UE-specific Doppler information received from the UE 805, and the UE-specific Doppler information received from the other UEs 810, are similar or identical. Thus, the base station 110 may determine that the UE 805 and the other UEs 810 may be grouped for communicating group-based signaling messages. Grouping the UEs for communicating the group-based signaling messages may reduce the need for network resources, time resources, and/or processing resources, when compared to communicating separate messages with each of the UEs in the group of UEs individually.

In some aspects, the group-based signaling message may include a compensation indicator. As described above, the UE 805 may receive a first communication from the base station 110 having a frequency $F_C$. However, the frequency of the first communication, as detected by the UE 805, may be offset (e.g., as shown in FIG. 7 by $F_C$-$F_{D1}$) as a result of the Doppler effect caused by the UE 805 moving relative to the base station 110. Similarly, the other UE 810 (e.g., the first other UE 810) may receive a second communication from the base station 110 having a frequency $F_C$. However, the frequency of the second communication, as detected by the UE 810, may be offset (e.g., as shown in FIG. 7 by $F_C$+$F_{D2}$) as a result of the Doppler effect caused by the other UE 810 moving relative to the base station 110.

In some aspects, the compensation indicator may be determined based at least in part on the frequency offset, and may be applied to future communications between the base station 110 and the UEs 805 and 810. In some aspects, the compensation indicator may include a value, such as the frequency offset $F_{D1}$ or $F_{D2}$. In some aspects, the compensation indicator may include information (e.g., which source RS to use for determining the QCL parameters) that the UE 805 or the other UE 810 can use to determine the frequency offset for the future communications. A communication that is transmitted in accordance with the compensation indicator may be received with minimal distortion due to the Doppler effect, or with no distortion due to the Doppler effect.

In some aspects, the compensation indicator may indicate a TCI state update. For example, as described above in connection with FIG. 4, the TCI state update may indicate to switch between a first TCI state for a first set of DMRS ports, and a second TCI state for a second set of DMRS ports. In some aspects, the compensation indicator may include a switch between the SFN and a non-SFN. For example, the non-SFN may be a single TRP communication configuration. As described above in connection with FIG. 5, the UE 805 using an SFN mode, in contrast to the UE 805 using a non-SFN mode, may be configured to determine a relationship between communications from different base stations or TRPs. In some aspects, the compensation indicator may include a change of an anchor base station for reception of future Doppler information. For example, the compensation indicator may indicate to switch from a first anchor base station 110-1 for determining the Doppler information to a second anchor base station 110-2 for determining the Doppler information. In some aspects, switching between an SFN TCI (e.g., a TCI codepoint that points to two TCI states) and TRP-specific TCI may be performed jointly for the group of UEs, since they experience similar channel profiles. In some aspects, a compensation indicator the base station 110 may update beams (e.g., TCI states) for the entire group of UEs.

In some aspects, a group leader may be configured to receive a group-based signaling message, such as the group-based signaling message that includes the compensation indicator. The group leader may be a leader for the group of UEs, such as the group of UEs that includes the UE 805 and the other UEs 810. As described herein, the group leader may be configured to receive the compensation indicator for the group of UEs, and to transmit the compensation indicator to the other UEs in the group of UEs. Additionally, or alternatively, the group leader may be configured to receive group-based information (e.g., group-based Doppler information) from the other UEs in the group of UEs, and to transmit the group-based information to the base station 110.

In some aspects, the base station 110 may determine the group leader for the group of UEs. For example, the UE 805 may receive an indication from the base station 110 that the UE 805 is the group leader for the group of UEs. The base station 110 may determine that the UE 805 is the group leader for the group of UEs based at least in part on information from the UE 805 and/or the other UEs 810, such as Doppler information, processing capability information, or RSRP information (e.g., Uu interface RSRP information), among other examples. In some aspects, the UE 805 may receive the compensation indicator from the base station 110, based at least in part on the UE 805 being the group leader, and may transmit the compensation indicator to the other UEs 810 (e.g., using a sidelink communication, as described in more detail below).

In some aspects, the UE 805 may transmit the group-based Doppler information to the base station 110 based at least in part on receiving the indication that the UE 805 is the group leader. In some aspects, the UE 805 may transmit the UE-specific Doppler information for the UE 805, which is representative of the group-based Doppler information, to the base station 110. In some aspects, the UE 805 may receive UE-specific Doppler information from each of the other UEs 810, and may transmit group-based Doppler information to the base station 110 that indicates the UE-specific Doppler information for each of the UE 805 and the other UEs 810. In some aspects, the UE 805 may receive UE-specific Doppler information from each of the other UEs 810, may determine group-based Doppler information from the UE-specific Doppler information, and may transmit the determined group-based Doppler information to the base station 110. In some aspects, the UE 805 may transmit an SRS to the base station 110, and the base station 110 may determine the group-based Doppler information based at least in part on the received SRS.

In some aspects, the UE 805 may receive an indication from the base station 110 to transmit the group-based Doppler information periodically (e.g., in accordance with a reporting interval). For example, the base station 110 may indicate for the UE 805, as the group leader, to transmit the group-based Doppler information every 100 milliseconds. In some aspects, the base station 110 may determine the reporting interval to be frequent enough for determining (e.g., updating) the UEs in the group, but not so frequent as to overload network resources. The UE 805 may periodically transmit the group-based Doppler information based at least in part on the indication from the base station 110.

In some aspects, the base station 110 may transmit, and the UE 805 may receive, information for determining whether one or more UEs should be included in the group of UEs. Thus, the UEs themselves may determine which UEs should be included in the group of UEs, using the information received from the base station 110. In some aspects, the UE 805 may determine whether the one or more UEs should be included in the group of UEs based at least in part on an RSRP of a sidelink reference signal received from the one or more UEs. For example, the UE 805 may determine to include a first other UE 810 in the group of UEs if the first other UE 810 has an RSRP (e.g., sidelink RSRP) above (or equal to) a threshold, and may determine not to include a second other UE 810 in the group of UEs if the second other UE 810 has an RSRP below (or equal to) the threshold. In some aspects, the UE 805 may periodically transmit the indication to the base station 110 that the one or more UEs should be included in the group of UEs in accordance with a reporting interval.

In some aspects, the base station 110 may transmit an indication for some of the UEs, or all of the UEs, to periodically transmit the group-based Doppler information. In some aspects, instead of selecting a single group leader, the base station 110 may indicate for some of the UEs, or all of the UEs, to alternate which UE will transmit the group-based Doppler information, such as for a time interval or during a time period. For example, the base station 110 may transmit an indication for the 805 to transmit the group-based Doppler information for a first time, for the first other UE 810 to transmit the group-based Doppler information for a second time, and for the second other UE 810 to transmit the group-based Doppler information for a third time. In some aspects, the indication to periodically transmit the group-based Doppler information may be an indication for the UE 805 to transmit the group-based Doppler information more frequently (e.g., more often) than other UEs in the group of UEs transmit the group-based Doppler information. For example, the indication may indicate for the UE 805 to transmit the group-based Doppler information every 100 ms, and for one of the other UEs 810 to transmit the group-based Doppler information every 500 ms.

In some aspects, the group of UEs, and the group leader of the group of UEs, may be based at least in part on a token from the base station 110. In some aspects, the grouping of the UEs may be transparent to the group of UEs, and the group leadership may not be known to the other UEs in the group. For example, the token may an uplink grant for configured grant transmission, or an SPS or aperiodic CSI transmission trigger, and may be signaled via DCI or MAC-CE to inform the intended UE to make an uplink transmission. In some aspects, as described in more detail below, the UEs may be configured with information for the group of UEs, and the group leadership may be known to the other UEs in the group.

As shown in connection with reference number 825, the UE 805 may communicate with the other UEs 810. The UE 805 may communicate with each of the other UEs 810, and each of the other UEs 810 (e.g., a first other UE 810) may communicate with any of the other UEs 810 (e.g., a second other UE 810). In some aspects, the communications may be sidelink communications, communications using Wi-Fi, and/or communications using Bluetooth, among other examples (e.g., using other radio access technologies).

In some aspects, as described above, the UE 805 may receive the UE-specific Doppler information from the other UEs 810, and may transmit the group-based Doppler information to the base station 110. The group-based Doppler information may include the UE-specific Doppler information for the UE 805 and each of the other UEs 810 (e.g., individual Doppler information), or may include Doppler information that is based at least in part on the UE-specific Doppler information for the UE 805 and each of the other UEs 810 (e.g., combined Doppler information). In some aspects, the reporting format, reporting intervals, and/or the resource allocation for reporting the group-based Doppler information may be configured with or without the involvement of the base station 110. For example, the group-based Doppler information may be relayed by the group leader, or some pre-processing of the report may be configured by the base station 110 (e.g., the mean Doppler and maximum delta may be sent in the Doppler report).

In some aspects, the UE 805 and the other UEs 810 may communicate to determine a group leader for the group of UEs. For example, the UE 805 and the other UEs 810 may communicate to determine the group leader, without any indication from the base station 110. In some aspects, the UE 805 may receive (e.g., from the other UEs 810) a communication that includes information for determining a group leader for transmitting the group-based Doppler information to the base station 110. In some aspects, the UE 805 may transmit, to the other UEs 810, an indication of a selection of the group leader. The indication of the selection of the group leader may be based at least in part on the information for determining the group leader received from the other UEs 810. In some aspects, the UE 805 may receive, from the other UEs 810, an indication that the UE 805 is the group leader. The UE 805 may transmit the group-based Doppler information to the base station 110 based at least in part on the indication that the UE 805 is the group leader.

In some aspects, the UE 805 may transmit a communication to the other UEs 810 that includes information received from the base station 110. In some aspects, the UE 805 may transmit the compensation indicator to the other UEs 810. For example, the compensation indicator may be a frequency offset, received from the base station 110, or determined by the UE 805, to be applied in future communications with the base station 110. Additionally, or alternatively, the compensation indicator may include an indication of the TCI state update, the QCL parameter update, the switch between the SFN and the non-SFN, or the change of the anchor base station, as described above. In some aspects, the UE 805 may transmit the information for determining the group leader, received from the base station 110, to the other UEs 810. Transmitting the information between the UEs themselves (e.g., using sidelink) may use less resources (e.g., network resources, time resources, and processing resources) as compared to transmitting the information from the base station 110 to each of the UEs individually.

As shown in connection with reference number 830, the UE 805 may receive a communication from the base station 110 that is based at least in part on the compensation indicator. As described above, communications using the compensation indicator may have a reduced Doppler effect, or no Doppler effect, when received at the UE 805. In some aspects, the communication may be a group-based communication, such as a communication that indicates the group-based Doppler information. For example, the UE 805, or any of the other UEs 810, may receive the group-based Doppler information for the group based at least in part on that UE being the group leader. In some aspects, the communication may be a separate communication to the UE from the base station (e.g., a communication that does not indicate Doppler information). Therefore, the UE 805, and the other UEs 810, may perform separate communications with the base station 110, but using the same compensation indicator.

As described above, the UE 805 and the other UEs 810 may have similar Doppler information since the UE 805 and the other UEs 810 have similar locations and/or are traveling at similar velocities (e.g., in the example that the UE 805 and the other UEs 810 are located on an HST). Since the UE 805 and the other UEs 810 are experiencing similar Doppler effects, the UE 805 and the other UEs 810 may apply a similar compensation indicator, or the same compensation indicator, to future communications with the base station 110 in order to reduce, or eliminate, the Doppler effect. By determining the compensation indicators, and transmitting the compensation indicators, at the group level (e.g., one compensation indicator for the group of UEs), the base station 110 may reduce the need for network resources, time resources, and/or processing resources. For example, determining the compensation indicators, and transmitting the compensation indicators, at the group level may use less network bandwidth, may take less time, and may require less processing by the base station 110.

As indicated above, FIG. 8 is provided as an example. Other examples may differ from what is described with respect to FIG. 8.

Figure 9:
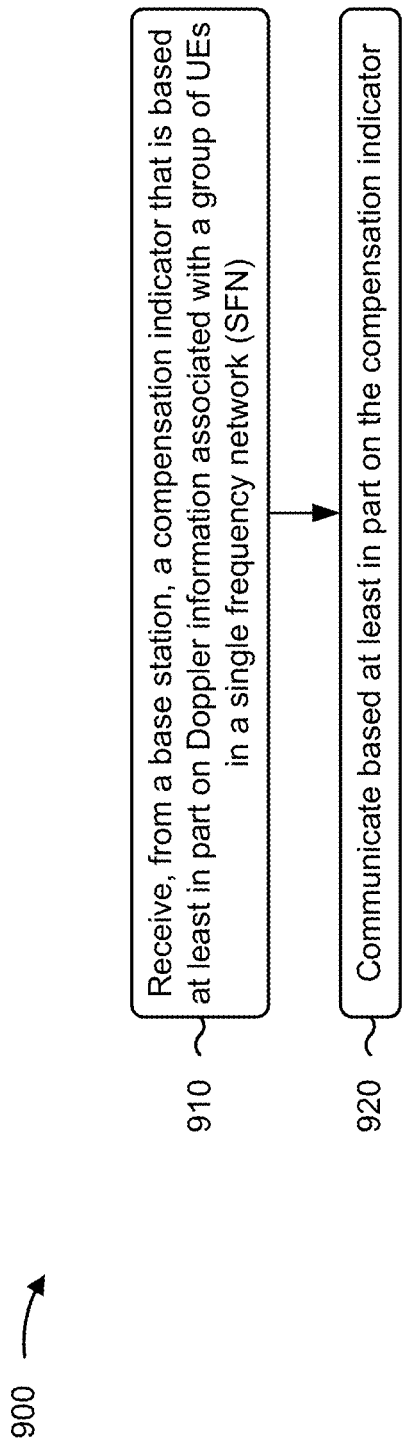
FIG. 9 is a diagram illustrating an example process associated with Doppler based UE grouping, in accordance with the present disclosure.

FIG. 9 is a diagram illustrating an example process 900 performed, for example, by a UE, in accordance with the present disclosure. Example process 900 is an example where the UE (e.g., UE 120) performs operations associated with Doppler based UE grouping.

As shown in FIG. 9, in some aspects, process 900 may include receiving, from a base station, a compensation indicator that is based at least in part on Doppler information associated with a group of UEs in an SFN (block 910). For example, the UE (e.g., using communication manager 140 and/or reception component 1102, depicted in FIG. 11) may receive, from a base station, a compensation indicator that is based at least in part on Doppler information associated with a group of UEs in the SFN, as described above.

As further shown in FIG. 9, in some aspects, process 900 may include communicating based at least in part on the compensation indicator (block 920). For example, the UE (e.g., using communication manager 140, reception component 1102, and/or transmission component 1104, depicted in FIG. 11) may communicate based at least in part on the compensation indicator, as described above.

Process 900 may include additional aspects, such as any single aspect or any combination of aspects described below and/or in connection with one or more other processes described elsewhere herein.

In a first aspect, the compensation indicator indicates one or more of a TCI state update, a QCL parameter update, a switch between the SFN and a non-SFN, or a change of an anchor base station for reception of future Doppler information.

In a second aspect, alone or in combination with the first aspect, process 900 includes transmitting a sidelink communication to at least one other UE in the group of UEs that indicates the TCI state update, the QCL parameter update, the switch between the SFN and the non-SFN, or the change of the anchor base station.

In a third aspect, alone or in combination with one or more of the first and second aspects, the Doppler information includes location information, Doppler shift information, or Doppler spread information.

In a fourth aspect, alone or in combination with one or more of the first through third aspects, process 900 includes transmitting, to the base station, Doppler information, an SRS, or CSI, associated with the UE, and receiving the compensation indicator based at least in part on transmitting the Doppler information, the SRS, or the CSI.

In a fifth aspect, alone or in combination with one or more of the first through fourth aspects, process 900 includes receiving an indication of a reporting interval from the base station, and transmitting the Doppler information, the SRS, or the CSI, in accordance with the reporting interval.

In a sixth aspect, alone or in combination with one or more of the first through fifth aspects, process 900 includes communicating with a plurality of UEs, and transmitting an indication to the base station that one or more UEs of the plurality of UEs should be included in the group of UEs.

In a seventh aspect, alone or in combination with one or more of the first through sixth aspects, process 900 includes receiving information from the base station for determining whether the one or more UEs should be included in the group of UEs.

In an eighth aspect, alone or in combination with one or more of the first through seventh aspects, process 900 includes determining whether the one or more UEs should be included in the group of UEs based at least in part on an RSRP of a sidelink reference signal received from the one or more UEs.

In a ninth aspect, alone or in combination with one or more of the first through eighth aspects, process 900 includes periodically transmitting the indication that the one or more UEs should be included in the group of UEs in accordance with a reporting interval.

In a tenth aspect, alone or in combination with one or more of the first through ninth aspects, process 900 includes receiving, from a second UE in the group of UEs, a communication that includes information for determining a group leader for transmitting group-based Doppler information to the base station.

In an eleventh aspect, alone or in combination with one or more of the first through tenth aspects, process 900 includes transmitting, to the second UE, an indication of a selection of the group leader.

In a twelfth aspect, alone or in combination with one or more of the first through eleventh aspects, process 900 includes receiving, from the second UE or a third UE in the group of UEs, an indication that the UE is the group leader, transmitting, to the base station, an indication that the UE is the group leader, and receiving the compensation indicator based at least in part on transmitting the indication that the UE is the group leader.

In a thirteenth aspect, alone or in combination with one or more of the first through twelfth aspects, process 900 includes receiving an indication from the base station that the UE is a group leader for transmitting group-based Doppler information.

In a fourteenth aspect, alone or in combination with one or more of the first through thirteenth aspects, process 900 includes transmitting, to the base station, the group-based Doppler information based at least in part on receiving the indication that the UE is the group leader.

In a fifteenth aspect, alone or in combination with one or more of the first through fourteenth aspects, process 900 includes transmitting, to the base station, a sounding reference signal associated with the group of UEs based at least in part on receiving the indication that the UE is the group leader.

In a sixteenth aspect, alone or in combination with one or more of the first through fifteenth aspects, process 900 includes receiving, from the base station, an indication to periodically transmit group-based Doppler information, and periodically transmitting the group-based Doppler information based at least in part on the indication.

In a seventeenth aspect, alone or in combination with one or more of the first through sixteenth aspects, process 900 includes periodically transmitting the group-based Doppler information more frequently than other UEs in the group of UEs transmit the group-based Doppler information.

In an eighteenth aspect, alone or in combination with one or more of the first through seventeenth aspects, process 900 includes receiving an indication from the base station that the group of UEs can be grouped for transmitting group-based Doppler information.

In a nineteenth aspect, alone or in combination with one or more of the first through eighteenth aspects, the Doppler information associated with the UE is similar to Doppler information associated with each UE in the group of UEs.

In a twentieth aspect, alone or in combination with one or more of the first through nineteenth aspects, the communicating based at least in part on the compensation indicator includes updating a reference signal for communicating with the base station, or updating a reference signal for communicating with another base station, based at least in part on the compensation indicator.

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
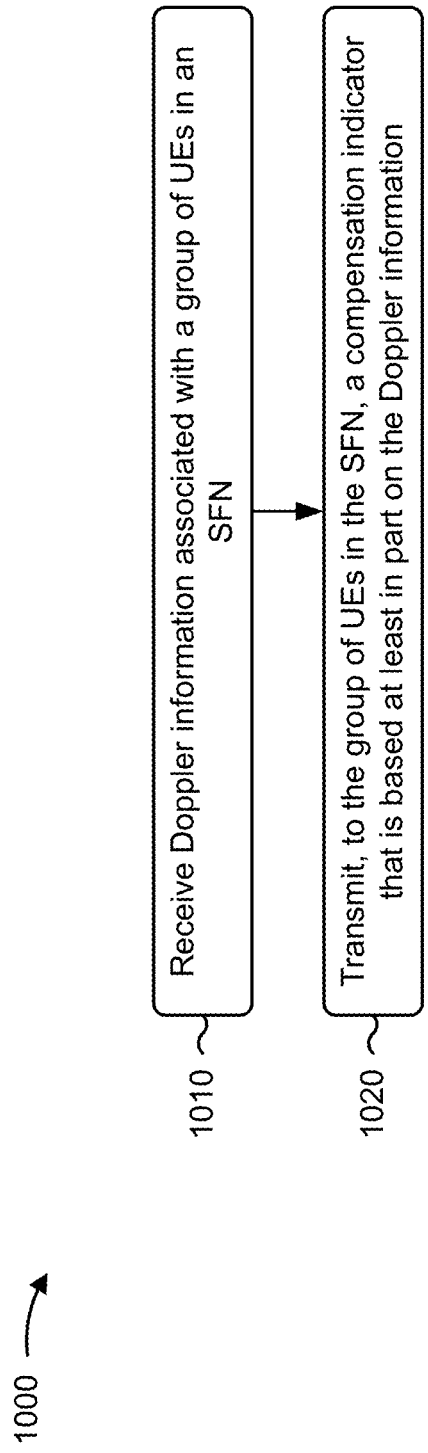
FIG. 10 is a diagram illustrating an example process associated with Doppler based UE grouping, in accordance with the present disclosure.

FIG. 10 is a diagram illustrating an example process 1000 performed, for example, by a base station, in accordance with the present disclosure. Example process 1000 is an example where the base station (e.g., base station 110) performs operations associated with Doppler based UE grouping.

As shown in FIG. 10, in some aspects, process 1000 may include receiving Doppler information associated with a group of UEs in an SFN (block 1010). For example, the base station (e.g., using communication manager 150 and/or reception component 1202, depicted in FIG. 12) may receive Doppler information associated with a group of UEs in the SFN, as described above.

As further shown in FIG. 10, in some aspects, process 1000 may include transmitting, to the group of UEs in the SFN, a compensation indicator that is based at least in part on the Doppler information (block 1020). For example, the base station (e.g., using communication manager 150 and/or transmission component 1204, depicted in FIG. 12) may transmit, to the group of UEs in the SFN, a compensation indicator that is based at least in part on the Doppler information, as described above.

Process 1000 may include additional aspects, such as any single aspect or any combination of aspects described below and/or in connection with one or more other processes described elsewhere herein.

In a first aspect, the compensation indicator indicates one or more of a TCI state update, a QCL parameter update, a switch between the SFN and a non-SFN, or a change of an anchor base station for reception of future Doppler information.

In a second aspect, alone or in combination with the first aspect, the Doppler includes location information, Doppler shift information, or Doppler spread information.

In a third aspect, alone or in combination with one or more of the first and second aspects, process 1000 includes transmitting an indication of a reporting interval.

In a fourth aspect, alone or in combination with one or more of the first through third aspects, process 1000 includes receiving the Doppler information, a sounding reference signal, or CSI, in accordance with the reporting interval.

In a fifth aspect, alone or in combination with one or more of the first through fourth aspects, process 1000 includes determining the Doppler information based at least in part on the CSI or a Layer 1 reference signal received power indicator.

In a sixth aspect, alone or in combination with one or more of the first through fifth aspects, the reporting interval is a non-periodic reporting interval or an adaptive reporting interval.

In a seventh aspect, alone or in combination with one or more of the first through sixth aspects, process 1000 includes transmitting information to the group of UEs for determining whether one or more UEs should be included in the group of UEs.

In an eighth aspect, alone or in combination with one or more of the first through seventh aspects, process 1000 includes receiving, from a UE in the group of UEs, an indication of one or more other UEs that should be included in the group of UEs.

In a ninth aspect, alone or in combination with one or more of the first through eighth aspects, the information for determining whether one or more UEs should be included in the group of UEs includes a reporting interval.

In a tenth aspect, alone or in combination with one or more of the first through ninth aspects, process 1000 includes receiving an indication that a UE in the group of UEs is acting as a group leader for transmitting group-based Doppler information.

In an eleventh aspect, alone or in combination with one or more of the first through tenth aspects, process 1000 includes transmitting an indication to a UE in the group of UEs that the UE is a group leader for transmitting group-based Doppler information.

In a twelfth aspect, alone or in combination with one or more of the first through eleventh aspects, process 1000 includes receiving the group-based Doppler information based at least in part on transmitting the indication that the UE is the group leader.

In a thirteenth aspect, alone or in combination with one or more of the first through twelfth aspects, process 1000 includes receiving a sounding reference signal associated with the group of UEs based at least in part on transmitting the indication that the UE is the group leader, and determining the group-based Doppler information based at least in part on receiving the sounding reference signal associated with the group of UEs.

In a fourteenth aspect, alone or in combination with one or more of the first through thirteenth aspects, process 1000 includes transmitting, to the group of UEs, an indication for each UE in the group of UEs to periodically report group-based Doppler information.

In a fifteenth aspect, alone or in combination with one or more of the first through fourteenth aspects, the indication for each UE in the group of UEs to periodically report the group-based Doppler information indicates that a first UE in the group of UEs should report the group-based Doppler information more frequently than a second UE in the group of UEs should report the group-based Doppler information.

In a sixteenth aspect, alone or in combination with one or more of the first through fifteenth aspects, process 1000 includes transmitting an indication to the group of UEs that the UEs can be grouped for transmitting the Doppler information.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
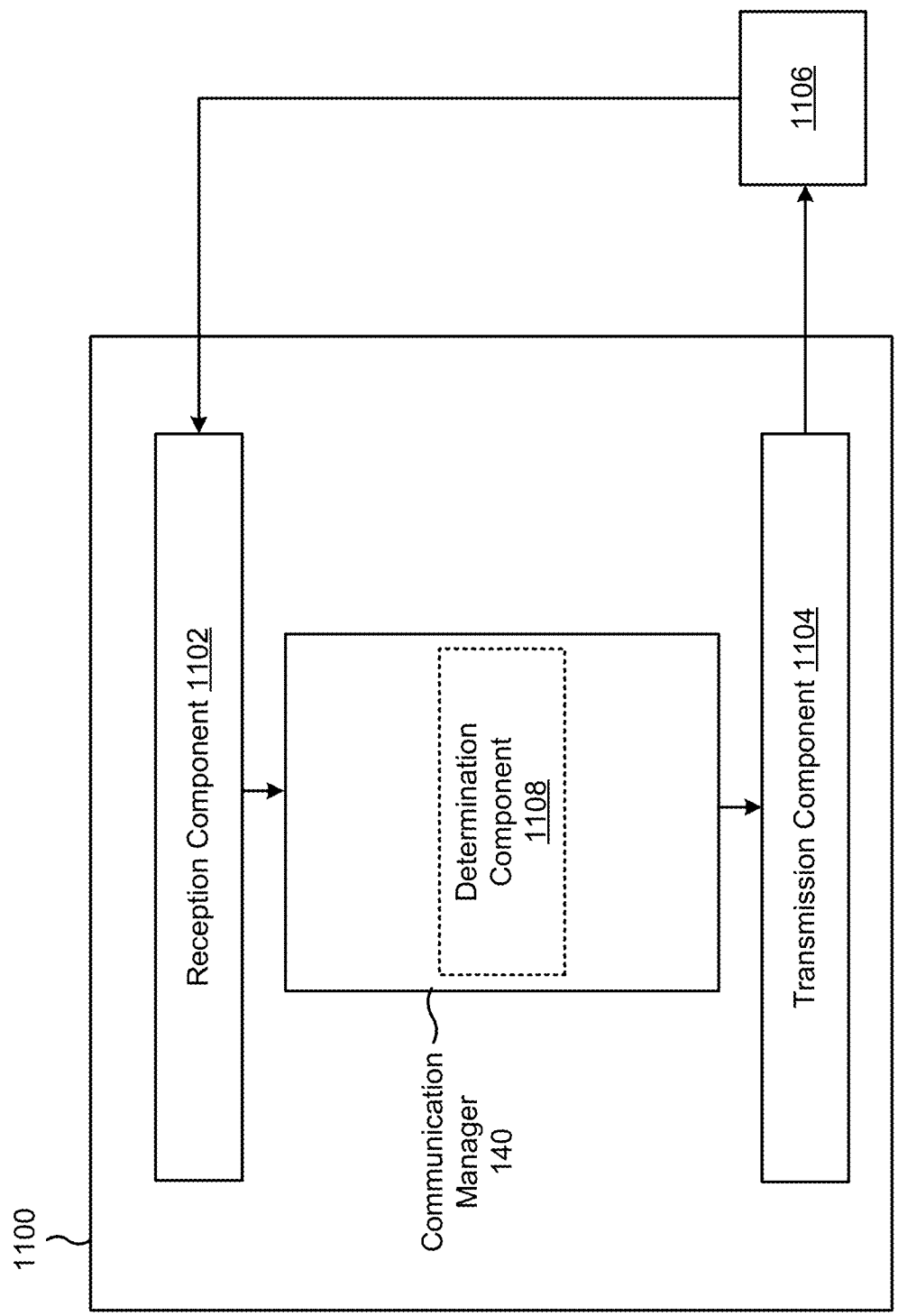
FIG. 11 is a diagram of an example apparatus for wireless communication, in accordance with the present disclosure.

FIG. 11 is a diagram of an example apparatus 1100 for wireless communication. The apparatus 1100 may be a UE, or a UE may include the apparatus 1100. In some aspects, the apparatus 1100 includes a reception component 1102 and a transmission component 1104, which may be in communication with one another (for example, via one or more buses and/or one or more other components). As shown, the apparatus 1100 may communicate with another apparatus 1106 (such as a UE, a base station, or another wireless communication device) using the reception component 1102 and the transmission component 1104. As further shown, the apparatus 1100 may include the communication manager 140. The communication manager 140 may include a determination component 1108, among other examples.

In some aspects, the apparatus 1100 may be configured to perform one or more operations described herein in connection with FIG. 8. Additionally, or alternatively, the apparatus 1100 may be configured to perform one or more processes described herein, such as process 900 of FIG. 9. In some aspects, the apparatus 1100 and/or one or more components shown in FIG. 11 may include one or more components of the UE described in connection with FIG. 2. Additionally, or alternatively, one or more components shown in FIG. 11 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1102 may receive communications, such as reference signals, control information, data communications, or a combination thereof, from the apparatus 1106. The reception component 1102 may provide received communications to one or more other components of the apparatus 1100. In some aspects, the reception component 1102 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1100. In some aspects, the reception component 1102 may include one or more antennas, a modem, a demodulator, a MIMO detector, a receive processor, a controller/processor, a memory, or a combination thereof, of the UE described in connection with FIG. 2.

The transmission component 1104 may transmit communications, such as reference signals, control information, data communications, or a combination thereof, to the apparatus 1106. In some aspects, one or more other components of the apparatus 1100 may generate communications and may provide the generated communications to the transmission component 1104 for transmission to the apparatus 1106. In some aspects, the transmission component 1104 may perform signal processing on the generated communications (such as filtering, amplification, modulation, digital-to-analog conversion, multiplexing, interleaving, mapping, or encoding, among other examples), and may transmit the processed signals to the apparatus 1106. In some aspects, the transmission component 1104 may include one or more antennas, a modem, a modulator, a transmit MIMO processor, a transmit processor, a controller/processor, a memory, or a combination thereof, of the UE described in connection with FIG. 2. In some aspects, the transmission component 1104 may be co-located with the reception component 1102 in a transceiver.

The reception component 1102 may receive, from a base station, a compensation indicator that is based at least in part on Doppler information associated with a group of UEs in an SFN. The reception component 1102 and/or the transmission component 1104 may communicate based at least in part on the compensation indicator.

The transmission component 1104 may transmit a sidelink communication to at least one other UE in the group of UEs that indicates the TCI state update, the QCL parameter update, the switch between the SFN and the non-SFN, or the change of the anchor base station.

The transmission component 1104 may transmit, to the base station, Doppler information, an SRS, or CSI, associated with the UE. The reception component 1102 may receive the compensation indicator based at least in part on transmitting the Doppler information, the SRS, or the CSI.

The reception component 1102 may receive an indication of a reporting interval from the base station. The transmission component 1104 may transmit the Doppler information, the SRS, or the CSI, in accordance with the reporting interval.

The reception component 1102 and/or the transmission component 1104 may communicate with a plurality of UEs. The transmission component 1104 may transmit an indication to the base station that one or more UEs of the plurality of UEs should be included in the group of UEs. The reception component 1102 may receive information from the base station for determining whether the one or more UEs should be included in the group of UEs.

The determination component 1108 may determine whether the one or more UEs should be included in the group of UEs based at least in part on an RSRP of a sidelink reference signal received from the one or more UEs.

The transmission component 1104 may periodically transmit the indication that the one or more UEs should be included in the group of UEs in accordance with a reporting interval.

The reception component 1102 may receive, from a second UE in the group of UEs, a communication that includes information for determining a group leader for transmitting group-based Doppler information to the base station. The transmission component 1104 may transmit, to the second UE, an indication of a selection of the group leader.

The reception component 1102 may receive, from the second UE or a third UE in the group of UEs, an indication that the UE is the group leader. The transmission component 1104 may transmit, to the base station, an indication that the UE is the group leader. The reception component 1102 may receive the compensation indicator based at least in part on transmitting the indication that the UE is the group leader.

The reception component 1102 may receive an indication from the base station that the UE is a group leader for transmitting group-based Doppler information. The transmission component 1104 may transmit, to the base station, the group-based Doppler information based at least in part on receiving the indication that the UE is the group leader. The transmission component 1104 may transmit, to the base station, a sounding reference signal associated with the group of UEs based at least in part on receiving the indication that the UE is the group leader.

The reception component 1102 may receive, from the base station, an indication to periodically transmit group-based Doppler information. The transmission component 1104 may periodically transmit the group-based Doppler information based at least in part on the indication. The transmission component 1104 may periodically transmit the group-based Doppler information more frequently than other UEs in the group of UEs transmit the group-based Doppler information.

The reception component 1102 may receive an indication from the base station that the group of UEs can be grouped for transmitting group-based Doppler information.

The number and arrangement of components shown in FIG. 11 are provided as an example. In practice, there may be additional components, fewer components, different components, or differently arranged components than those shown in FIG. 11. Furthermore, two or more components shown in FIG. 11 may be implemented within a single component, or a single component shown in FIG. 11 may be implemented as multiple, distributed components. Additionally, or alternatively, a set of (one or more) components shown in FIG. 11 may perform one or more functions described as being performed by another set of components shown in FIG. 11.

Figure 12:
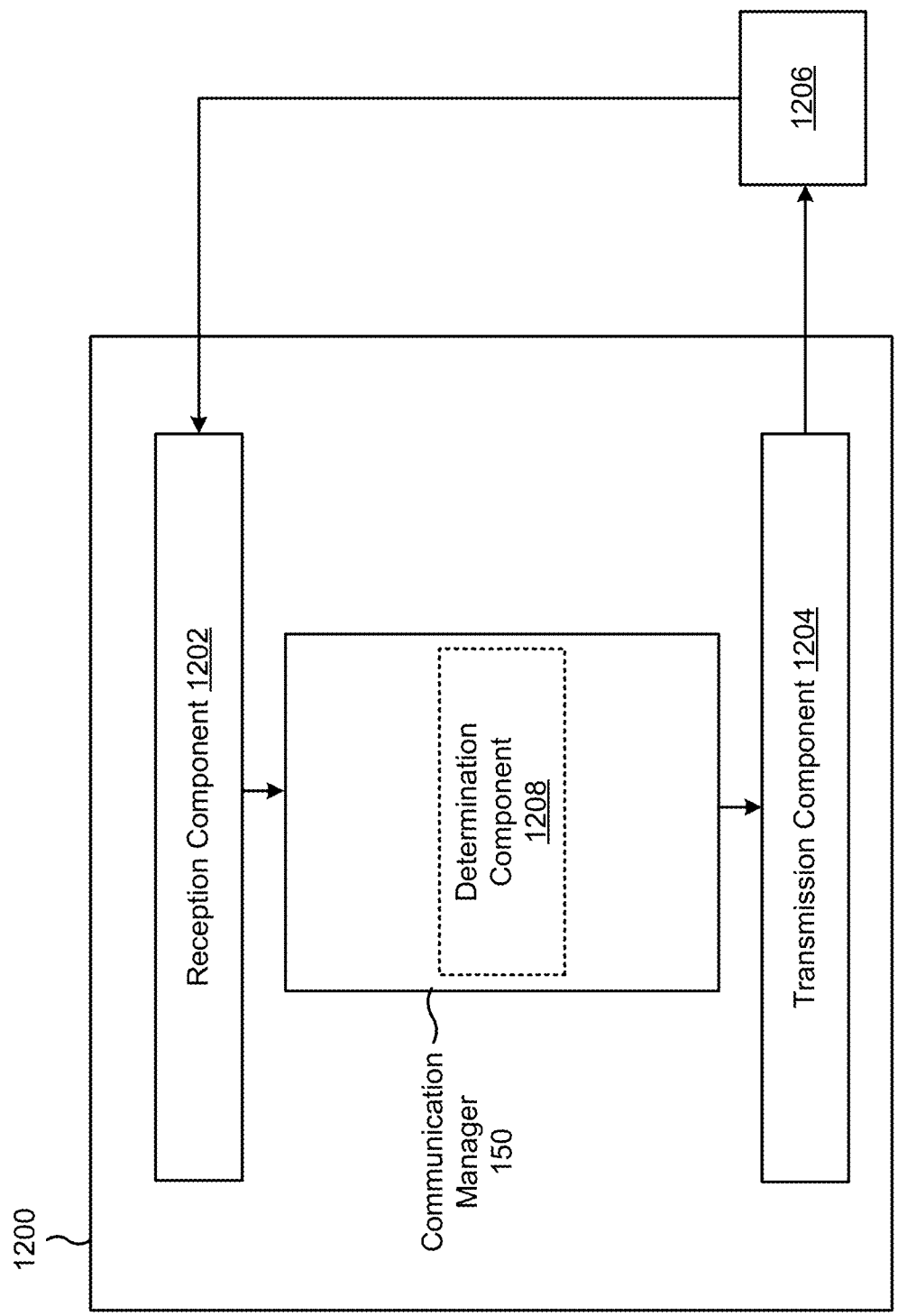
FIG. 12 is a diagram of an example apparatus for wireless communication, in accordance with the present disclosure.

FIG. 12 is a diagram of an example apparatus 1200 for wireless communication. The apparatus 1200 may be a base station, or a base station may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a base station, or another wireless communication device) using the reception component 1202 and the transmission component 1204. As further shown, the apparatus 1200 may include the communication manager 150. The communication manager 150 may include a determination component 1208, among other examples.

In some aspects, the apparatus 1200 may be configured to perform one or more operations described herein in connection with FIG. 8. Additionally, or alternatively, the apparatus 1200 may be configured to perform one or more processes described herein, such as process 1000 of FIG. 10. In some aspects, the apparatus 1200 and/or one or more components shown in FIG. 12 may include one or more components of the base station described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the base station described in connection with FIG. 2.

The transmission component 1204 may transmit communications, such as reference signals, control information, data communications, or a combination thereof, to the apparatus 1206. In some aspects, one or more other components of the apparatus 1200 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/processor, a memory, or a combination thereof, of the base station described in connection with FIG. 2. In some aspects, the transmission component 1204 may be co-located with the reception component 1202 in a transceiver.

The reception component 1202 may receive Doppler information associated with a group of UEs in an SFN. The transmission component 1204 may transmit, to the group of UEs in the SFN, a compensation indicator that is based at least in part on the Doppler information.

The transmission component 1204 may transmit an indication of a reporting interval. The reception component 1202 may receive the Doppler information, a sounding reference signal, or CSI, in accordance with the reporting interval. The determination component 1208 may determine the Doppler information based at least in part on the CSI or a Layer 1 reference signal received power indicator.

The transmission component 1204 may transmit information to the group of UEs for determining whether one or more UEs should be included in the group of UEs. The reception component 1202 may receive, from a UE in the group of UEs, an indication of one or more other UEs that should be included in the group of UEs.

The reception component 1202 may receive an indication that a UE in the group of UEs is acting as a group leader for transmitting group-based Doppler information.

The transmission component 1204 may transmit an indication to a UE in the group of UEs that the UE is a group leader for transmitting group-based Doppler information. The reception component 1202 may receive the group-based Doppler information based at least in part on transmitting the indication that the UE is the group leader.

The reception component 1202 may receive a sounding reference signal associated with the group of UEs based at least in part on transmitting the indication that the UE is the group leader. The determination component 1208 may determine the group-based Doppler information based at least in part on receiving the sounding reference signal associated with the group of UEs.

The transmission component 1204 may transmit, to the group of UEs, an indication for each UE in the group of UEs to periodically report group-based Doppler information.

The transmission component 1204 may transmit an indication to the group of UEs that the UEs can be grouped for transmitting the Doppler information.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

The following provides an overview of some Aspects of the present disclosure:

Aspect 1: A method of wireless communication performed by a user equipment (UE), comprising: receiving, from a base station, a compensation indicator that is based at least in part on Doppler information associated with a group of UEs in a single frequency network (SFN); and communicating based at least in part on the compensation indicator.

Aspect 2: The method of Aspect 1, wherein the compensation indicator indicates one or more of a transmission configuration indicator (TCI) state update, a quasi co-location (QCL) parameter update, a switch between the SFN and a non-SFN, or a change of an anchor base station for reception of future Doppler information.

Aspect 3: The method of Aspect 2, further comprising transmitting a sidelink communication to at least one other UE in the group of UEs that indicates the TCI state update, the QCL parameter update, the switch between the SFN and the non-SFN, or the change of the anchor base station.

Aspect 4: The method of any of Aspects 1-3, wherein the Doppler information includes location information, Doppler shift information, or Doppler spread information.

Aspect 5: The method of any of Aspects 1-4, further comprising: transmitting, to the base station, Doppler information, a sounding reference signal (SRS), or channel state information (CSI), associated with the UE; and receiving the compensation indicator based at least in part on transmitting the Doppler information, the SRS, or the CSI.

Aspect 6: The method of Aspect 5, further comprising: receiving an indication of a reporting interval from the base station; and transmitting the Doppler information, the SRS, or the CSI, in accordance with the reporting interval.

Aspect 7: The method of any of Aspects 1-6, further comprising: communicating with a plurality of UEs; and transmitting an indication to the base station that one or more UEs of the plurality of UEs should be included in the group of UEs.

Aspect 8: The method of Aspect 7, further comprising receiving information from the base station for determining whether the one or more UEs should be included in the group of UEs.

Aspect 9: The method of Aspect 7, further comprising determining whether the one or more UEs should be included in the group of UEs based at least in part on a reference signal received power of a sidelink reference signal received from the one or more UEs.

Aspect 10: The method of Aspect 7, further comprising periodically transmitting the indication that the one or more UEs should be included in the group of UEs in accordance with a reporting interval.

Aspect 11: The method of any of Aspects 1-10, further comprising receiving, from a second UE in the group of UEs, a communication that includes information for determining a group leader for transmitting group-based Doppler information to the base station.

Aspect 12: The method of Aspect 11, further comprising transmitting, to the second UE, an indication of a selection of the group leader.

Aspect 13: The method of Aspect 11, further comprising: receiving, from the second UE or a third UE in the group of UEs, an indication that the UE is the group leader; transmitting, to the base station, an indication that the UE is the group leader; and receiving the compensation indicator based at least in part on transmitting the indication that the UE is the group leader.

Aspect 14: The method of any of Aspects 1-10, further comprising receiving an indication from the base station that the UE is a group leader for transmitting group-based Doppler information.

Aspect 15: The method of Aspect 14, further comprising transmitting, to the base station, the group-based Doppler information based at least in part on receiving the indication that the UE is the group leader.

Aspect 16: The method of Aspect 14, further comprising transmitting, to the base station, a sounding reference signal associated with the group of UEs based at least in part on receiving the indication that the UE is the group leader.

Aspect 17: The method of any of Aspects 1-16, further comprising: receiving, from the base station, an indication to periodically transmit group-based Doppler information; and periodically transmitting the group-based Doppler information based at least in part on the indication.

Aspect 18: The method of Aspect 17, further comprising periodically transmitting the group-based Doppler information more frequently than other UEs in the group of UEs transmit the group-based Doppler information.

Aspect 19: The method of any of Aspects 1-18, further comprising receiving an indication from the base station that the group of UEs can be grouped for transmitting group-based Doppler information.

Aspect 20: The method of any of Aspects 1-19, wherein the Doppler information associated with the UE is similar to Doppler information associated with each UE in the group of UEs.

Aspect 21: The method of any of Aspects 1-20, wherein the communicating based at least in part on the compensation indicator includes updating a reference signal for communicating with the base station, or updating a reference signal for communicating with another base station, based at least in part on the compensation indicator.

Aspect 22: A method of wireless communication performed by a base station, comprising: receiving Doppler information associated with a group of user equipments (UEs) in a single frequency network (SFN); and transmitting, to the group of UEs in the SFN, a compensation indicator that is based at least in part on the Doppler information.

Aspect 23: The method of Aspect 22, wherein the compensation indicator indicates one or more of a transmission configuration indicator (TCI) state update, a quasi co-location (QCL) parameter update, a switch between the SFN and a non-SFN, or a change of an anchor base station for reception of future Doppler information.

Aspect 24: The method of any of Aspects 22-23, wherein the Doppler information includes location information, Doppler shift information, or Doppler spread information.

Aspect 25: The method of any of Aspects 22-24, further comprising transmitting an indication of a reporting interval.

Aspect 26: The method of Aspect 25, further comprising receiving the Doppler information, a sounding reference signal, or channel state information (CSI), in accordance with the reporting interval.

Aspect 27: The method of Aspect 26, further comprising determining the Doppler information based at least in part on the CSI or a Layer 1 reference signal received power indicator.

Aspect 28: The method of Aspect 25, wherein the reporting interval is a non-periodic reporting interval or an adaptive reporting interval.

Aspect 29: The method of any of Aspects 22-28, further comprising transmitting information to the group of UEs for determining whether one or more UEs should be included in the group of UEs.

Aspect 30: The method of Aspect 29, further comprising receiving, from a UE in the group of UEs, an indication of one or more other UEs that should be included in the group of UEs.

Aspect 31: The method of Aspect 29, wherein the information for determining whether one or more UEs should be included in the group of UEs includes a reporting interval.

Aspect 32: The method of any of Aspects 22-31, further comprising receiving an indication that a UE in the group of UEs is acting as a group leader for transmitting group-based Doppler information.

Aspect 33: The method of any of Aspects 22-32, further comprising transmitting an indication to a UE in the group of UEs that the UE is a group leader for transmitting group-based Doppler information.

Aspect 34: The method of Aspect 33, further comprising receiving the group-based Doppler information based at least in part on transmitting the indication that the UE is the group leader.

Aspect 35: The method of Aspect 33, further comprising: receiving a sounding reference signal associated with the group of UEs based at least in part on transmitting the indication that the UE is the group leader; and determining the group-based Doppler information based at least in part on receiving the sounding reference signal associated with the group of UEs.

Aspect 36: The method of any of Aspects 22-35, further comprising transmitting, to the group of UEs, an indication for each UE in the group of UEs to periodically report group-based Doppler information.

Aspect 37: The method of Aspect 36, wherein the indication for each UE in the group of UEs to periodically report the group-based Doppler information indicates that a first UE in the group of UEs should report the group-based Doppler information more frequently than a second UE in the group of UEs should report the group-based Doppler information.

Aspect 38: The method of any of Aspects 22-37, further comprising transmitting an indication to the group of UEs that the UEs can be grouped for transmitting the Doppler information.

Aspect 39: An apparatus for wireless communication at a device, comprising a processor; memory coupled with the processor; and instructions stored in the memory and executable by the processor to cause the apparatus to perform the method of one or more of Aspects 1-21.

Aspect 40: A device for wireless communication, comprising a memory and one or more processors coupled to the memory, the one or more processors configured to perform the method of one or more of Aspects 1-21.

Aspect 41: An apparatus for wireless communication, comprising at least one means for performing the method of one or more of Aspects 1-21.

Aspect 42: A non-transitory computer-readable medium storing code for wireless communication, the code comprising instructions executable by a processor to perform the method of one or more of Aspects 1-21.

Aspect 43: A non-transitory computer-readable medium storing a set of instructions for wireless communication, the set of instructions comprising one or more instructions that, when executed by one or more processors of a device, cause the device to perform the method of one or more of Aspects 1-21.

Aspect 44: An apparatus for wireless communication at a device, comprising a processor; memory coupled with the processor; and instructions stored in the memory and executable by the processor to cause the apparatus to perform the method of one or more of Aspects 22-38.

Aspect 45: A device for wireless communication, comprising a memory and one or more processors coupled to the memory, the one or more processors configured to perform the method of one or more of Aspects 22-38.

Aspect 46: An apparatus for wireless communication, comprising at least one means for performing the method of one or more of Aspects 22-38.

Aspect 47: A non-transitory computer-readable medium storing code for wireless communication, the code comprising instructions executable by a processor to perform the method of one or more of Aspects 22-38.

Aspect 48: A non-transitory computer-readable medium storing a set of instructions for wireless communication, the set of instructions comprising one or more instructions that, when executed by one or more processors of a device, cause the device to perform the method of one or more of Aspects 22-38.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
   one or more memories; and
   one or more processors, coupled to the one or more memories, configured to:
      receive, from a base station, a compensation indicator that is based at least in part on Doppler information associated with a group of UEs in a single frequency network (SFN) that are grouped in accordance with UEs, of the group of UEs, having similar UE-specific Doppler information, the similar UE-specific Doppler information including location information or Doppler spread information; and
      communicate based at least in part on the compensation indicator.

2. The apparatus of claim 1, wherein the compensation indicator indicates one or more of a transmission configuration indicator (TCI) state update, a quasi co-location (QCL) parameter update, a switch between the SFN and a non-SFN, or a change of an anchor base station for reception of future Doppler information.

3. The apparatus of claim 2, wherein the one or more processors are further configured to transmit a sidelink communication to at least one other UE in the group of UEs that indicates the TCI state update, the QCL parameter update, the switch between the SFN and the non-SFN, or the change of the anchor base station.

4. The apparatus of claim 1, wherein the Doppler information includes location information, Doppler shift information, or Doppler spread information.

5. The apparatus of claim 1, wherein the one or more processors are further configured to:
   transmit, to the base station, Doppler information, a sounding reference signal (SRS), or channel state information (CSI), associated with the UE; and
   receive the compensation indicator based at least in part on transmitting the Doppler information, the SRS, or the CSI.

6. The apparatus of claim 5, wherein the one or more processors are further configured to:
   receive an indication of a reporting interval from the base station; and
   transmit the Doppler information, the SRS, or the CSI, in accordance with the reporting interval.

7. The apparatus of claim 1, wherein the one or more processors are further configured to:
communicate with a plurality of UEs; and
transmit an indication to the base station that one or more UEs of the plurality of UEs should be included in the group of UEs.

8. The apparatus of claim 7, wherein the one or more processors are further configured to receive information from the base station for determining whether the one or more UEs should be included in the group of UEs.

9. The apparatus of claim 1, wherein the one or more processors are further configured to receive, from a second UE in the group of UEs, a communication that includes information for determining a group leader for transmitting group-based Doppler information to the base station.

10. The apparatus of claim 9, wherein the one or more processors are further configured to:
receive, from the second UE or a third UE in the group of UEs, an indication that the UE is the group leader;
transmit, to the base station, an indication that the UE is the group leader; and
receive the compensation indicator based at least in part on transmitting the indication that the UE is the group leader.

11. The apparatus of claim 1, wherein the one or more processors are further configured to receive an indication from the base station that the UE is a group leader for transmitting group-based Doppler information.

12. The apparatus of claim 11, wherein the one or more processors are further configured to transmit, to the base station, the group-based Doppler information based at least in part on receiving the indication that the UE is the group leader.

13. The apparatus of claim 11, wherein the one or more processors are further configured to transmit, to the base station, a sounding reference signal associated with the group of UEs based at least in part on receiving the indication that the UE is the group leader.

14. The apparatus of claim 1, wherein the one or more processors are further configured to:
receive, from the base station, an indication to periodically transmit group-based Doppler information; and
periodically transmit the group-based Doppler information based at least in part on the indication.

15. The apparatus of claim 1, wherein the communicating based at least in part on the compensation indicator includes updating a reference signal for communicating with the base station, or updating a reference signal for communicating with another base station, based at least in part on the compensation indicator.

16. An apparatus for wireless communication at a base station, comprising:
one or more memories; and
one or more processors, coupled to the one or more memories, configured to:
receive Doppler information associated with a group of user equipments (UEs) in a single frequency network (SFN) that are grouped in accordance with UEs, of the group of UEs, having similar UE-specific Doppler information, the similar UE-specific Doppler information including location information or Doppler spread information; and
transmit, to the group of UEs in the SFN, a compensation indicator that is based at least in part on the Doppler information.

17. The apparatus of claim 16, wherein the compensation indicator indicates one or more of a transmission configuration indicator (TCI) state update, a quasi co-location (QCL) parameter update, a switch between the SFN and a non-SFN, or a change of an anchor base station for reception of future Doppler information.

18. The apparatus of claim 16, wherein the Doppler information includes location information, Doppler shift information, or Doppler spread information.

19. The apparatus of claim 16, wherein the one or more processors are further configured to transmit an indication of a reporting interval.

20. The apparatus of claim 19, wherein the one or more processors are further configured to receive the Doppler information, a sounding reference signal, or channel state information (CSI), in accordance with the reporting interval.

21. The apparatus of claim 16, wherein the one or more processors are further configured to transmit information to the group of UEs for determining whether one or more UEs should be included in the group of UEs.

22. The apparatus of claim 16, wherein the one or more processors are further configured to receive an indication that a UE in the group of UEs is acting as a group leader for transmitting group-based Doppler information.

23. The apparatus of claim 16, wherein the one or more processors are further configured to transmit an indication to a UE in the group of UEs that the UE is a group leader for transmitting group-based Doppler information.

24. A method of wireless communication performed by a user equipment (UE), comprising:
receiving, from a base station, a compensation indicator that is based at least in part on Doppler information associated with a group of UEs in a single frequency network (SFN) that are grouped in accordance with UEs, of the group of UEs, having similar UE-specific Doppler information, the similar UE-specific Doppler information including location information or Doppler spread information; and
communicating based at least in part on the compensation indicator.

25. The method of claim 24, wherein the compensation indicator indicates one or more of a transmission configuration indicator (TCI) state update, a quasi co-location (QCL) parameter update, a switch between the SFN and a non-SFN, or a change of an anchor base station for reception of future Doppler information.

26. The method of claim 24, further comprising:
communicating with a plurality of UEs; and
transmitting an indication to the base station that one or more UEs of the plurality of UEs should be included in the group of UEs.

27. The method of claim 24, further comprising receiving an indication from the base station that the UE is a group leader for transmitting group-based Doppler information.

28. The method of claim 24, further comprising receiving an indication from the base station that the group of UEs can be grouped for transmitting group-based Doppler information.

29. A method of wireless communication performed by a base station, comprising:
receiving Doppler information associated with a group of user equipments (UEs) in a single frequency network (SFN) that are grouped in accordance with UEs, of the group of UEs, having similar UE-specific Doppler information, the similar UE-specific Doppler information including location information or Doppler spread information; and transmitting, to the group of UEs in the SFN, a compensation indicator that is based at least in part on the Doppler information.

30. The method of claim 29, wherein the compensation indicator indicates one or more of a transmission configuration indicator (TCI) state update, a quasi co-location (QCL) parameter update, a switch between the SFN and a non-SFN, or a change of an anchor base station for reception of future Doppler information.

* * * * *